United States Patent
Ode

(10) Patent No.: US 9,214,989 B2
(45) Date of Patent: Dec. 15, 2015

(54) MOBILE COMMUNICATION SYSTEM, BASE STATION, MOBILE STATION, AND RADIO COMMUNICATION METHOD

(71) Applicant: FUJITSU LIMITED, Kawasaki-shi, Kanagawa (JP)

(72) Inventor: Takayoshi Ode, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 324 days.

(21) Appl. No.: 13/648,823

(22) Filed: Oct. 10, 2012

(65) Prior Publication Data

US 2013/0040691 A1 Feb. 14, 2013

Related U.S. Application Data

(63) Continuation of application No. PCT/JP2010/057571, filed on Apr. 28, 2010.

(51) Int. Cl.
| | |
|---|---|
| H04B 7/00 | (2006.01) |
| H04B 7/02 | (2006.01) |
| H04W 4/06 | (2009.01) |
| H04W 52/14 | (2009.01) |
| H04W 52/40 | (2009.01) |
| H04L 29/06 | (2006.01) |

(52) U.S. Cl.
CPC .............. *H04B 7/022* (2013.01); *H04W 4/06* (2013.01); *H04L 69/14* (2013.01); *H04W 52/143* (2013.01); *H04W 52/40* (2013.01)

(58) Field of Classification Search
CPC ....................................................... H04L 69/14
USPC ..................................... 455/524, 69, 502, 509
See application file for complete search history.

(56) References Cited

U.S. PATENT DOCUMENTS

| | | | |
|---|---|---|---|
| 7,720,508 B2 | 5/2010 | Moon et al. | |
| 8,731,480 B2* | 5/2014 | Kim et al. ........................ | 455/69 |
| 2006/0009230 A1 | 1/2006 | Fukumoto et al. | |
| 2007/0249380 A1* | 10/2007 | Stewart et al. ................ | 455/502 |

(Continued)

FOREIGN PATENT DOCUMENTS

| | | |
|---|---|---|
| CN | 101682881 A | 3/2010 |
| EP | 2 068 465 A1 | 6/2009 |
| EP | 2 106 181 A2 | 9/2009 |

(Continued)

OTHER PUBLICATIONS

Japanese Office Action issued by Japanese Patent Office corresponding Japanese Patent Application No. 2012-512590, issued on Dec. 3, 2013, with English translation.

(Continued)

*Primary Examiner* — Sanh Phu
(74) *Attorney, Agent, or Firm* — Myers Wolin, LLC

(57) ABSTRACT

Two or more base stations among a plurality of base stations transmit data of the same content at the same timing. A base station notifies a mobile station of two or more base stations which transmit the data of the same content among the plurality of base stations. The mobile station transmits information indicating reception conditions in the mobile station of radio signals from the base stations notified of, to the base station. According to the information indicating the reception conditions, the base station instructs the mobile station to receive the data of the same content from the base stations.

15 Claims, 29 Drawing Sheets

(56) References Cited

U.S. PATENT DOCUMENTS

| | | |
|---|---|---|
| 2011/0195662 A1 | 8/2011 | Seo et al. |
| 2012/0087423 A1 | 4/2012 | Ko et al. |

FOREIGN PATENT DOCUMENTS

| | | |
|---|---|---|
| EP | 2 312 886 A1 | 4/2011 |
| JP | 2005-142935 | 6/2005 |
| JP | 2005-142935 A | 6/2005 |
| JP | 2006-504322 | 2/2006 |
| JP | 2006-135445 | 5/2006 |
| JP | 2008-278339 | 11/2008 |
| JP | 2009-188612 | 8/2009 |
| JP | 2009-542083 | 11/2009 |
| KR | 2009-0128343 A | 12/2009 |
| KR | 2010-0030575 A | 3/2010 |
| WO | 2004/039100 | 5/2004 |
| WO | 2007/148911 | 12/2007 |
| WO | 2008/038336 | 4/2008 |
| WO | 2008/095523 A1 | 8/2008 |
| WO | 2008/127185 A1 | 10/2008 |
| WO | 2009/044345 A2 | 4/2009 |
| WO | 2009/133767 | 11/2009 |
| WO | 2009/136736 A2 | 11/2009 |
| WO | 2010/016266 A1 | 2/2010 |
| WO | 2010/016607 A1 | 2/2010 |
| WO | 2010/030124 A2 | 3/2010 |

OTHER PUBLICATIONS

Notice of Preliminary Rejection issued for corresponding Korean Paten Application No. 10-2012-7027871, mailed on Feb. 24, 2014, with an English translation.
3GPP TS 25.331 V7.13.0, (Jun. 2009).
3GPP TR 36.912 V9.0.0 (Sep. 2009), 3rd Generation Partnership Project; Technical Specification Group Radio Access Network; Feasibility study for Further Advancements for E-UTRA (LTE-Advanced) (Release 9).
3GPP TS 36.300 V9.2.0 (Dec. 2009), 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 9).
3GPP TS 36.211 V9.0.0 (Dec. 2009),3rd Generation Partnership Project; Technical Specification Group Radio Access Network; Evolved Universal Terrestrial Radio Access (E-UTRA); Physical Channels and Modulation (Release 9).
International Search Report issued for corresponding International Patent Application No. PCT/JP2010/057571, mailed Aug. 10, 2010.
First Notification of Office Action issued for corresponding Chinese Patent Application No. 2010800663917 dated Sep. 3, 2014, with an English translation.
Notice of Final Rejection issued for corresponding Korean Patent Application No. 10-2012-7027871, mailed Sep. 5, 2014, with an English translation.
Office Action issued for corresponding Taiwan Application No. 099113485, dated Feb. 18, 2014, with an English translation.
Office Action issued for corresponding Taiwanese Patent Application No. 99113485 dated Jul. 14, 2015 with an English translation.
3RD Generation Partnership Project (3GPP), "Technical Specification Group Radio Access Network; Evolved Universal Terrestrial Radio Access (E-UTRA) and Evolved Universal Terrestrial Radio Access Network (E-UTRAN); Overall description; Stage 2 (Release 9)", pp. 1-166, 3GPP TS 36.300 V9.3.0 (Mar. 2010), 3GPP, Sophia Antipolis, Valbonne, France, Mar. 2010.
Extended European search report with the supplementary European search report and the European search opinion issued for corresponding European Application No. 10850711.2 dated Sep. 16, 2015.

* cited by examiner

MOBILE COMMUNICATION SYSTEM, BASE STATION, MOBILE STATION, AND RADIO COMMUNICATION METHOD

CROSS-REFERENCE TO RELATED APPLICATION

This application is a continuation application of International Application PCT/JP2010/057571 filed on Apr. 28, 2010 and designated the U.S., the entire contents of which are incorporated herein by reference.

FIELD

The embodiments discussed herein are related to a mobile communication system, a base station, a mobile station, and a radio communication method.

BACKGROUND

A plurality of mobile communication systems such as a cellular-phone system and a radio MAN (Metropolitan Area Network) are currently used. For attaining a further speeding up and large capacity of radio communication, lively discussion is continuously performed about a next generation mobile communication technology.

For example, in a 3GPP (3rd Generation Partnership Project) being one of standardization organizations, there is proposed a communication standard referred to as an LTE (Long Term Evolution) enabling communication using a frequency band of 20 MHz at a maximum. Further, as a next generation communication standard of LTE, there is proposed a communication standard referred to as an LTE-A (Long Term Evolution-Advanced) enabling communication using a frequency band of 100 MHz at a maximum.

In addition, in the LTE or LTE-A, there is studied adoption of a data transmission method referred to as an MBSFN (Multimedia Broadcast multicast service Single Frequency Network). In the MBSFN, a plurality of base stations transmit data of the same content at the same timing by using the same frequency and modulation scheme. Data transmitted via the MBSFN may be referred to as an MBMS (Multimedia Broadcast Multicast Service). When radio signals from a plurality of base stations are combined, a mobile station improves reception quality.

With regard to the MBSFN, there is proposed a technology in which a mobile terminal receives synchronization information used to receive broadcast type data in an MBSFN area and searches for a cell in which the MBSFN area is configured (see, for example, Japanese Laid-open Patent Publication No. 2009-188612). Further, there is proposed a technology in which in addition to a serving base station in which a mobile terminal measures reception quality of each base station and which performs scheduling of the mobile terminal, other base stations selected according to the measured quality transmit broadcast type data (see, for example, International Publication Pamphlet No. WO 2008/038336). In addition, there is proposed a technology in which for the purpose of reducing the number of cells to be measured by a mobile terminal, the number of adjacent cells broadcast as system information is suppressed (see, for example, International Publication Pamphlet No. WO 2007/148911).

Incidentally, there is the possibility that when all base stations which exist in a certain area uniformly perform processing for transmitting data of the same content at the same timing, utilization efficiency of radio resources is reduced. To cope with the problem, among the base stations which exist in the area, the base stations which perform the foregoing transmission processing are considered to be limited to some of them.

However, in a mobile communication system in which base stations which perform the transmission processing and base stations which do not perform the transmission processing mixedly exist, how to control mobile stations which receive data transmitted through the foregoing transmission processing becomes problematic. Specifically, there is the possibility that the base station is incapable of smoothly controlling reception processing of mobile stations in a control method in which a mobile station and a base station which gives data of preferred reception quality to the mobile station simply communicate with each other, as in a technology disclosed in International Publication Pamphlet No. WO 2008/038336.

SUMMARY

According to an aspect of the embodiments to be discussed herein, there is provided a mobile communication system which includes: a plurality of base stations; and a mobile station, wherein: among the plurality of base stations, two or more base stations transmit data of the same content at the same timing; a base station among the plurality of base stations includes a notification unit which notifies the mobile station of the two or more other base stations transmitting the data of the same content among the plurality of base stations, and a controller which instructs the mobile station to receive the data of the same content from the two or more other base stations according to information indicating reception conditions in the mobile station of radio signals from the two or more other base stations; and the mobile station includes a transmitter which transmits information indicating reception conditions of radio signals from the two or more other base stations notified of from the base station, and a receiver which receives the data of the same content from the two or more other base stations according to an instruction from the base station.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Figure 1:
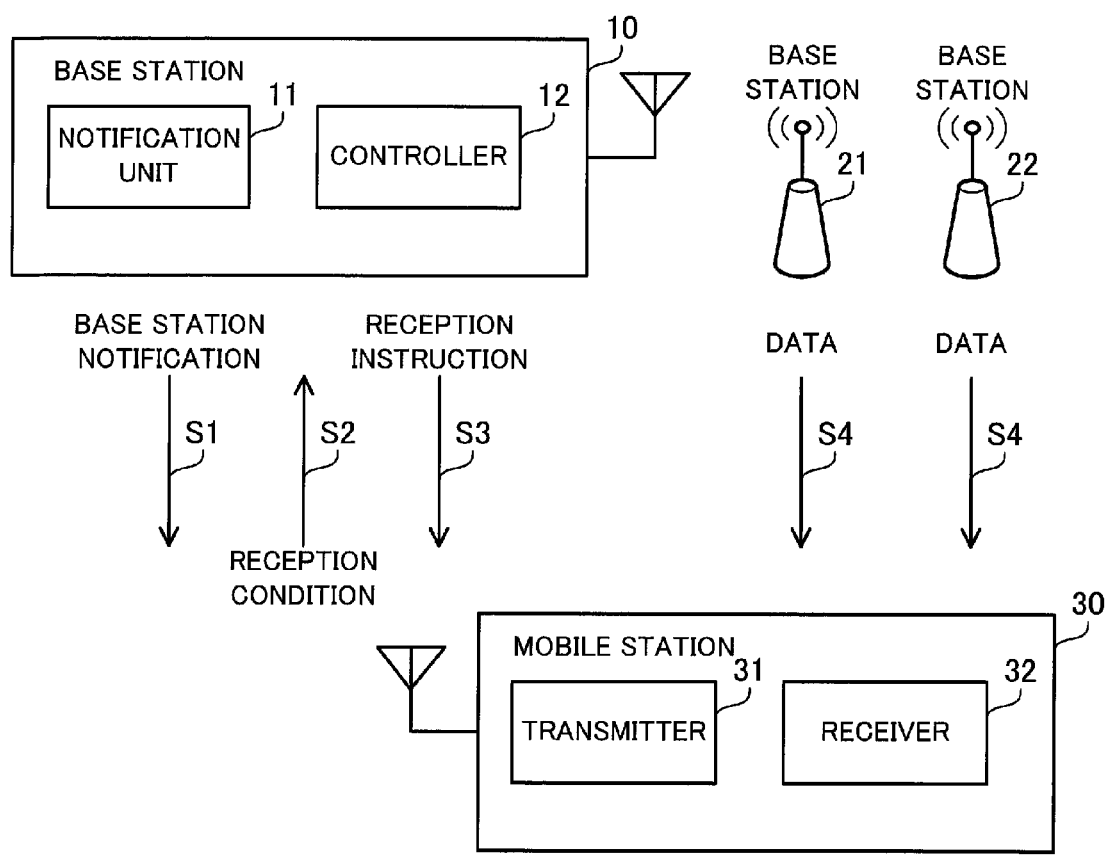
FIG. 1 illustrates a mobile communication system according to a first embodiment.

Preferred embodiments of the present invention will now be described in detail below with reference to the accompanying drawings, wherein like reference numerals refer to like elements throughout.

(First Embodiment)

FIG. 1 illustrates a mobile communication system according to a first embodiment. The mobile communication system according to the first embodiment includes a plurality of base stations and a mobile station 30.

The plurality of base stations include two or more base stations which transmit data of the same content at the same timing in a coordinated manner. For example, the two or more base stations perform the above-described MBSFN transmission. The plurality of base stations further include a base station which does not perform the data transmission. The plurality of base stations include base stations 10, 21, and 22. The base stations 21 and 22 transmit the data of the same content in a coordinated manner. The base station 10 may transmit or may not have to transmit the data of the same content along with the base stations 21 and 22.

The base station 10 has a notification unit 11 and a controller 12. The notification unit 11 notifies the mobile station 30 of two or more other base stations (base stations 21 and 22) which transmit the data of the same content at the same timing among the plurality of base stations. According to information indicating reception conditions of the mobile station 30 of radio signals from the base stations 21 and 22 notified of, received from the mobile station 30, the controller instructs the mobile station 30 to receive the data of the same content from the base stations 21 and 22. In addition to the information about the reception conditions, for example, the base station 10 may perform an instruction to the mobile station 30 with reference to a data transmission request from the mobile station 30.

The mobile station 30 has a transmitter 31 and a receiver 32. After reception of notifications from the base stations 21 and 22 which transmit the data of the same content at the same timing, the transmitter 31 transmits information indicating the reception conditions of radio signals from the base stations 21 and 22 to the base station 10. According to the instruction from the base station 10 received after the transmission of the information indicating the reception conditions, the receiver 32 receives the data of the same content from the base stations 21 and 22.

Specifically, the base station 10 notifies the mobile station 30 of the base stations 21 and 22 which transmit data of the same content at the same timing among a plurality of base stations (Step S1). The mobile station 30 transmits to the base station 10 the information indicating reception conditions of the mobile station 30 of radio signals from the base stations 21 and 22 notified of (Step S2). According to the information indicating the reception conditions, the base station 10 instructs the mobile station 30 to receive the data of the same content from the base stations 21 and 22 (Step S3). After the reception of the instruction from the base station 10, the mobile station 30 receives the data of the same content transmitted at the same timing by the base stations 21 and 22 (Step S4).

Here, based on performance conditions of the data transmission of the same content in the base station 10, the notification unit 11 may notify the mobile station 30 of the base stations 21 and 22. Among mobile stations connected to the base station 10, for example, when the number of mobile stations which receive the data of the same content from two or more base stations is smaller than a predetermined threshold, the notification unit 11 is considered to perform notification. In addition, when transmission efficiency calculated based on the data amount transmitted in sync with other base stations by the base station 10 and the radio resource amount usable for transmission of the data is smaller than a predetermined threshold, the notification unit 11 is considered to perform notification.

Whether to perform notification to the mobile station may be determined at the time when the mobile station 30 requests to the base station 10 the data transmitted in a coordinated manner by two or more base stations. Alternatively, Whether to perform notification to the mobile station 30 may be determined at the time when the number of the mobile stations which are connected to the base station 10 and which receive the data of the same content from two or more base stations is reduced.

For the reception conditions of radio signals from the base stations 21 and 22, the mobile station 30 may measure reception quality such as reception power or radio channel quality (e.g., CIR (Carrier to Interference Ratio)) of radio signals. Suppose that the base stations 21 and 22 transmit data of the same content and normal data except the same in time division. In this case, the mobile station 30 may measure reception quality by using radio signals in duration in which data of the same content is transmitted, or by using radio signals in duration in which normal data is transmitted.

The information indicating reception conditions transmitted from the transmitter 31 to the base station 10 may be information indicating reception quality of each of the base stations 21 and 22, or information indicating one reception quality of the entire base stations 21 and 22. Further, the information indicating reception conditions may be information indicating whether the reception quality measured in the mobile station 30 satisfies predetermined criteria.

Only in the case where reception quality indicated by the information about reception conditions is higher than a predetermined threshold, the controller 12 may instruct the mobile station 30 to receive the data of the same content from the base stations 21 and 22. Whether to perform the instruction to the mobile station 30 may be determined by the controller 12, or by a control device connected to the base station 10 via a network. In the latter case, for example, the base station 10 transfers to the control device the information indicating the reception conditions received from the mobile station 30.

In the case where instructing the mobile station 30 to receive the data of the same content from the base stations 21 and 22, the controller 12 may control the base station 10 not to transmit the data of the same content. On the other hand, in the case where the mobile station 30 is not instructed to receive the data of the same content from the base stations 21 and 22 (e.g., in the case where the reception quality measured by the mobile station 30 does not satisfy predetermined criteria), the controller 12 may control the base station 10 to transmit the data of the same content.

The first embodiment provides a mobile communication system in which the base station 10 smoothly controls reception processing of a mobile station even under environments in which base stations which transmit data of the same content at the same timing and base stations which do not transmit data of the same content at the same timing mixedly exist. Namely, the base station 10 induces the mobile station 30 to communicate with the base stations (base stations 21 and 22) which transmit data of the same content at the same timing among a plurality of base stations. After inducing the mobile station 30 to communicate with the base stations 21 and 22, the base station 10 may not have to transmit data of the same content. Accordingly, these features of the present embodiment permit the base station 10 to easily suppress the number of the base stations which transmit the data of the same content at the same timing, and improve utilization efficiency of radio resources.

In the following second to seventh embodiments, the radio communication method according to the first embodiment is considered to be applied to an LTE system or LTE-A system. Note that the foregoing radio communication method is, as a matter of course, applicable to other types of mobile communication systems.

(Second Embodiment)

Figure 2:
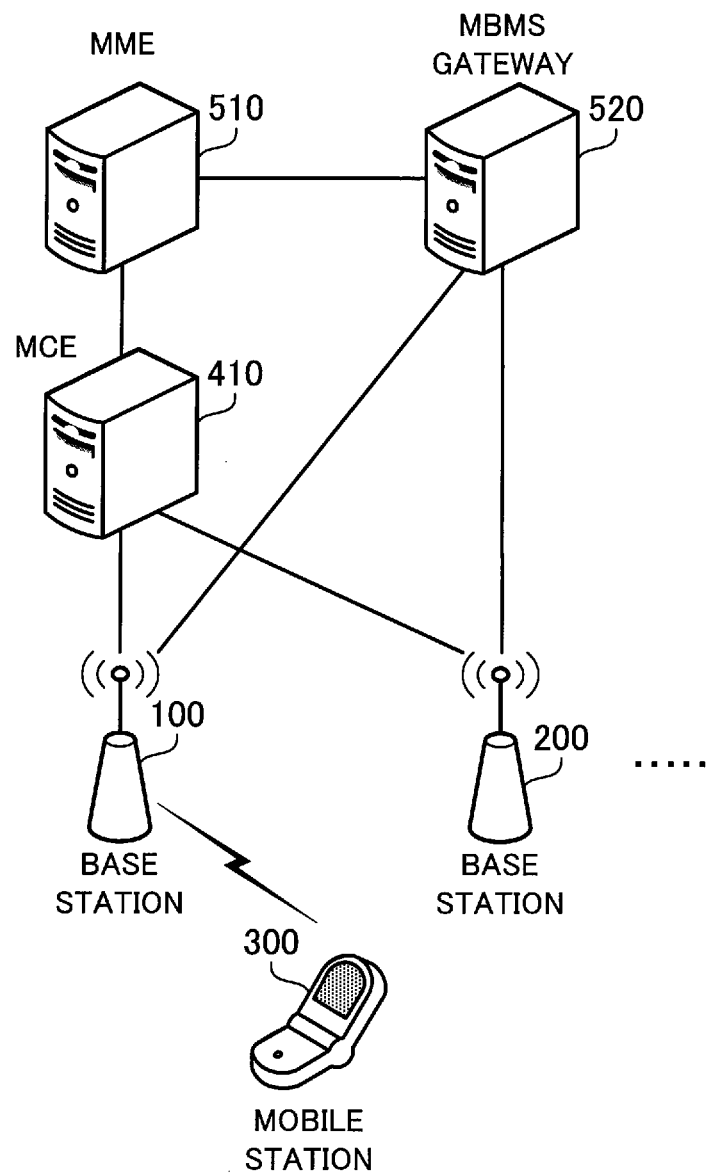
FIG. 2 illustrates a mobile communication system according to a second embodiment.

FIG. 2 illustrates a mobile communication system according to a second embodiment. The mobile communication system according to the second embodiment includes the following elements: a plurality of base stations including base stations 100 and 200, a mobile station 300, an MCE (Multi-cell/multicast Coordination Entity) 410, an MME (Mobility Management Entity) 510, and an MBMS gateway 520.

The base stations 100 and 200 are radio communication apparatus capable of performing radio communication with the mobile station 300. The base stations 100 and 200 are connected to the MCE 410 and MBMS gateway 520 via a wired network. The base stations 100 and 200 perform MBSFN transmission. Specifically, the base stations 100 and 200 receive MBMS data from the MBMS gateway 520, and transmit the MBMS data of the same content at the same timing by using the same frequency and modulation scheme. The base stations 100 and 200 further transfer user data except the MBMS data between an SAE (System Architecture Evolution) gateway (not illustrated) and the mobile station 300.

The mobile station 300 is a radio terminal apparatus capable of performing radio communication between its own station and a plurality of base stations including the base stations 100 and 200. Examples of the mobile station 300 include a cellular phone handset and a personal digital assistant. The mobile station 300 receives the MBSFN-transmitted MBMS data. That is, the mobile station 300 combines radio signals from a plurality of base stations which perform the MBSFN transmission and performs demodulation and decoding, thereby extracting the MBMS data. As a result, a reception characteristic of the MBMS data is improved. The mobile station 300 further transmits and receives user data except the MBMS data between its own station and the currently-connected base station. Suppose here that the mobile station 300 is connected to the base station 100.

The MCE 410 is a communication device which controls the MBSFN transmission through the base stations 100 and 200. The MCE 410 transmits and receives control parameters to and from the base stations 100 and 200 via a wired network, and manages a base station which performs the MBSFN transmission and schedules the MBSFN transmission. According to the scheduling result, the MCE 410 instructs the MBMS gateway 520 to transmit the MBMS data.

The MME 510 is a communication device which performs a mobility management, specifically, a management of in-range cells of the mobile station 300 or paging of the mobile station 300. The MME 510 is connected to the MCE 410 via a wired network.

According to the instruction from the MCE 410, the MBMS gateway 520 is a communication device which performs transmission processing of the MBMS data. The MBMS gateway 520 transmits the MBMS data to the base station which performs the MBSFN transmission.

As described above, this mobile communication system is deployed as an LTE system or LTE-A system. In 3GPP, specifications of the MBSFN in the LTE are defined by a specification sheet of release 9, and specifications of the MBSFN in the LTE-A are defined by a specification sheet of release 10.

Figure 3:
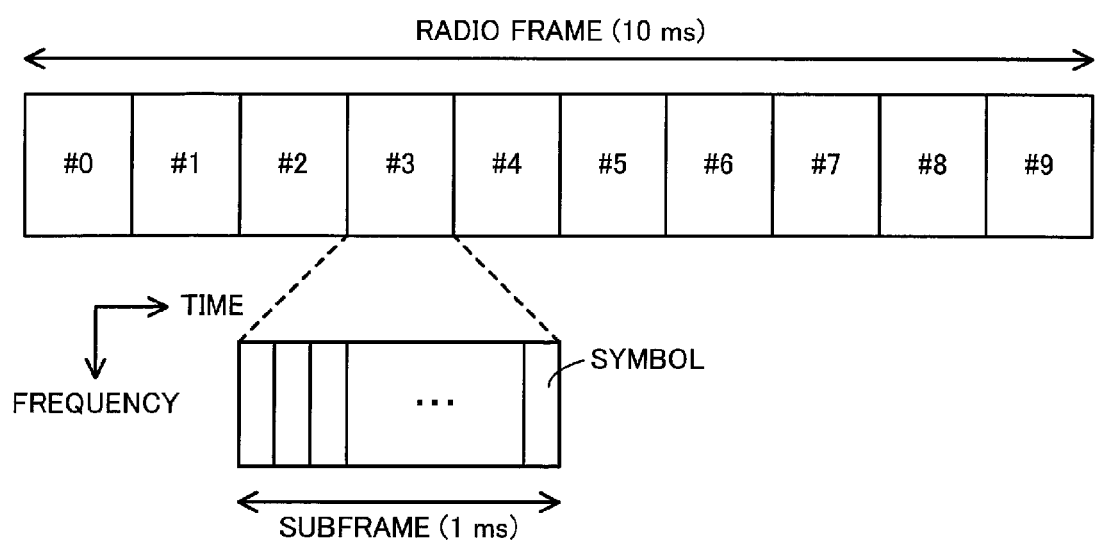
FIG. 3 illustrates a structure example of a radio frame.

FIG. 3 illustrates a structure example of a radio frame. The radio frame as illustrated in FIG. 3 is transmitted and received between the mobile station 300 and any of the base stations 100 and 200. It is assumed here that an FDD (Frequency Division Duplex) is used as a duplex system. Specifically, the radio frame as illustrated in FIG. 3 is transmitted and received to respective DL (Downlink) and UL (Uplink). Note that a TDD (Time Division Duplex) may be used as the duplex system. Further, a structure of the radio frame is not limited thereto.

In this example, in a radio frame having a period of 10 ms, 10 subframes (subframes #0 to #9) each having a length of 1 ms are included. The scheduling of radio resources is performed in units of subframe. A radio resource in the subframe is segmentalized in the time direction and frequency direction for management. A minimum unit in the frequency direction is a subcarrier, and a minimum unit in the time direction is a symbol. Each subframe includes 12 or 14 symbols as described later.

The above-described radio resource having an area of frequency×time is allocated to various channels. On a DL radio frame, a PDSCH (Physical Downlink Shared CHannel) for transmitting normal user data except the MBMS data or control parameters of an upper layer is provided. A PDCCH (Physical Downlink Control CHannel) for transmitting an L1/L2 (Layer 1/Layer 2) control signal is further provided on the DL radio frame. In addition, a PMCH (Physical Multicast CHannel) for transmitting the MBMS data and MBSFN control signal is provided on the DL radio frame.

On the DL radio frame, a P-SCH (Primary Synchronization CHannel) and S-SCH (Secondary Synchronization CHannel) for transmitting a synchronization signal are further provided. In the DL radio frame, an RS (Reference Signal) as a known pilot signal is transmitted.

On a UL radio frame, a PUSCH (Physical Uplink Shared CHannel) for transmitting user data or control parameters is provided. A PUCCH (Physical Uplink Control CHannel) for transmitting an L1/L2 (Layer 1/Layer 2) control signal is further provided on the UL radio frame.

Here, the MBMS data is transmitted by using an MTCH (Multicast Traffic CHannel) as a logical channel. The MBSFN control signal is transmitted by using an MCCH (Multicast Control CHannel) as a logical channel. The MTCH and MCCH are mapped to an MCH (Multicast CHannel) as a traffic channel. The MCH is mapped to the PMCH as a physical channel.

A subframe (MBSFN subframe) used to transmit the MBSFN is different from other subframes (normal subframes) in a symbol structure. Specifically, the normal subframe includes 14 symbols and each symbol includes the after-mentioned normal CP (Cyclic Prefix). On the other hand, the MBSFN subframe includes 12 symbols, and each symbol includes the after-mentioned extended CP. The normal CP is different from the extended CP in a signal length. Barring some exceptions, user data except the MBMS data is not transmitted in the MBSFN subframe.

As a multiple access scheme, for example, an OFDMA (Orthogonal Frequency Division Multiple Access) is used in the DL radio frame. On the other hand, for example, an SC-FDMA (Single-Carrier Frequency Division Multiple Access) or NxSC-FDMA (N times SC-FDMA) is used in the UL radio frame.

Figure 4:
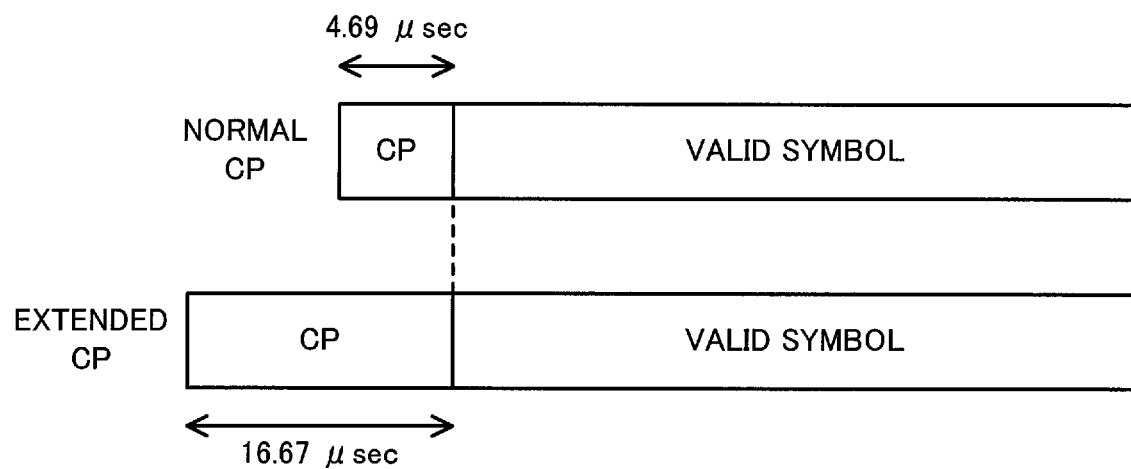
FIG. 4 illustrates examples of a normal CP and an extended CP.

FIG. 4 illustrates examples of the normal CP and extended CP. As illustrated in FIG. 4, each symbol has a valid symbol as a data portion and a CP as a guard interval. The CP is obtained by reproducing a signal in an end portion of the valid symbol, and added to a front portion of the valid symbol. A time length of the normal CP is 4.69 μsec and a time length of the extended CP is 16.67 μsec. In the case of using the normal CP and the extended CP, a valid symbol length is the same as each other.

As described above, the extended CP is used in the MBSFN subframe. The mobile station 300 combines with an advance wave a delay wave in which a delay time is smaller than or equal to a time length of the CP, thereby performing demodulation. Therefore, when using the extended CP, the mobile station 300 combines and demodulates a signal from a farther base station as compared with the case of using the normal CP.

Figure 5:
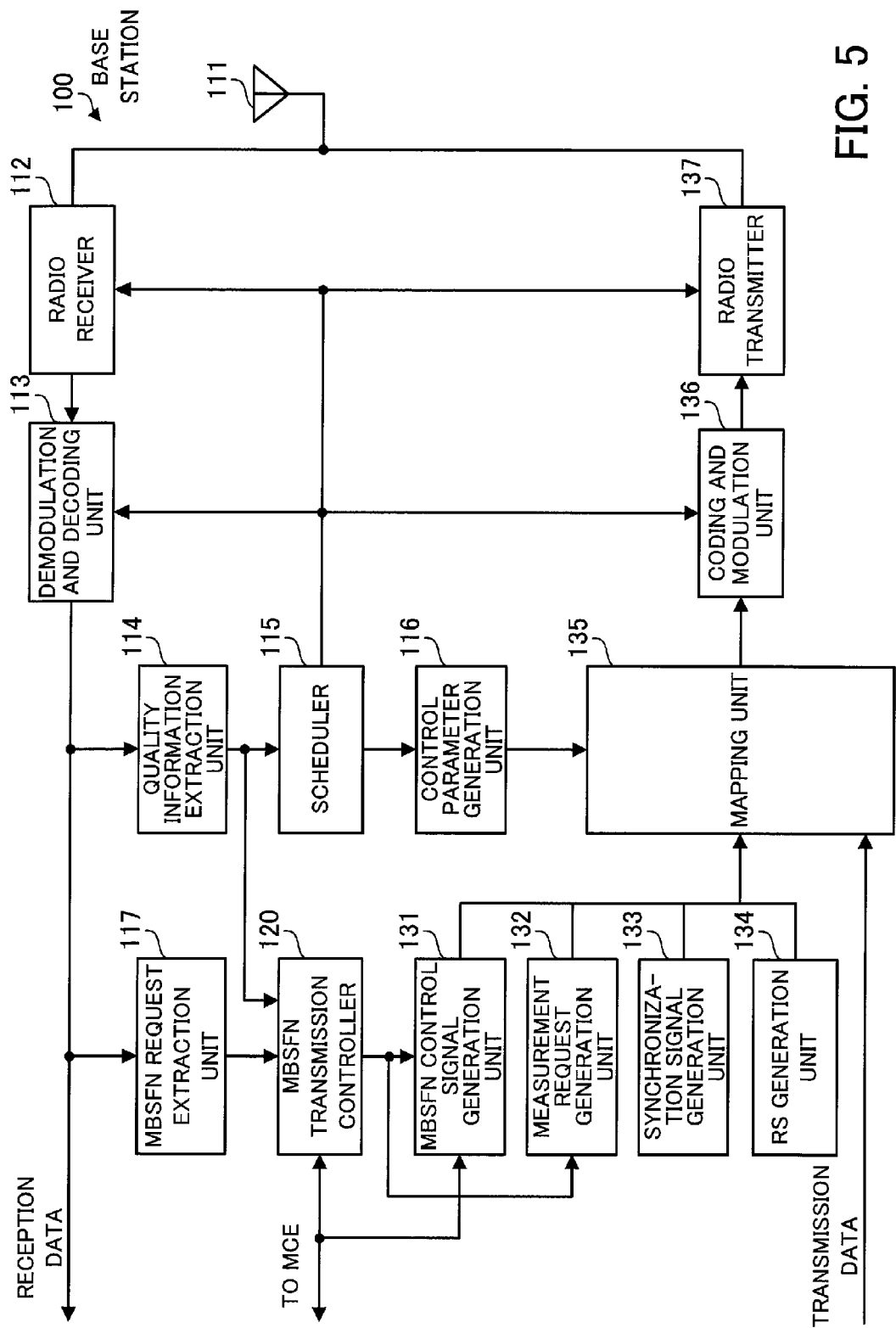
FIG. 5 is a block diagram illustrating a base station according to a second embodiment.

FIG. 5 is a block diagram illustrating a base station according to the second embodiment. The base station 100 includes the following elements: an antenna 111, a radio receiver 112, a demodulation and decoding unit 113, a quality information extraction unit 114, a scheduler 115, a control parameter generation unit 116, an MBSFN request extraction unit 117, an MBSFN transmission controller 120, an MBSFN control signal generation unit 131, a measurement request generation unit 132, a synchronization signal generation unit 133, an RS generation unit 134, a mapping unit 135, a coding and modulation unit 136, and a radio transmitter 137. Also, other base stations are deployed by the same block structure as that of the base station 100.

The antenna 111 receives a radio signal transmitted by the mobile station 300, and supplies it to the radio receiver 112. On the other hand, the antenna 111 wirelessly outputs the transmission signal produced from the radio transmitter 137. In place of the antenna 111 used for both transmission and reception, a transmission antenna and a reception antenna may be separately provided on the base station 100. Diversity transmission may be further performed by using a plurality of antennas.

The radio receiver 112 radio-signal processes a signal received from the antenna 111, and performs conversion (down-convert) from a high frequency radio signal to a low frequency baseband signal. For processing a radio signal, for example, the radio receiver 112 has circuits such as an LNA (Low Noise Amplifier), a frequency converter, a BPF (Band Pass Filter), and an A/D (Analog to Digital) converter.

The demodulation and decoding unit 113 demodulates and error-correction decodes a baseband signal produced from the radio receiver 112. The demodulation and decoding are performed by a predetermined MCS (Modulation and Coding Scheme) or a scheme corresponding to the modulation and coding scheme instructed by the scheduler 115. The demodulation and decoding unit 113 transfers the extracted user data to an SAE gateway.

The quality information extraction unit 114 extracts quality information indicating a measurement report of reception quality, being control parameters transmitted by the mobile station 300. The quality information extraction unit 114 then supplies the quality information about normal data transmission to the scheduler 115, and supplies the quality information about MBSFN transmission to the MBSFN transmission controller 120.

Based on the quality information produced from the quality information extraction unit 114, the scheduler 115 allocates radio resources to the mobile station 300. The scheduler 115 then notifies of allocation conditions on the radio resources the radio receiver 112, the demodulation and decoding unit 113, the control parameter generation unit 116, the coding and modulation unit 136, and the radio transmitter 137. Based on the quality information, the scheduler 115 adaptively selects a modulation and coding scheme. The scheduler 115 then notifies the demodulation and decoding unit 113, the control parameter generation unit 116, and the coding and modulation unit 136 of the selected modulation and coding scheme.

Based on the notification from the scheduler 115, the control parameter generation unit 116 generates control parameters to be transmitted by using the PDCCH. The control parameters include information indicating allocation of radio resources and information indicating the modulation and coding scheme applied to the user data. The control parameter generation unit 116 supplies the generated control parameters to the mapping unit 135.

The MBSFN request extraction unit 117 extracts the MBSFN request (control parameters indicating a request of the MBSFN transmission) transmitted by the mobile station 300. The MBSFN request includes information indicating the MBMS data, and is transmitted by the PUSCH provided on the UL radio frame. The MBSFN request extraction unit 117 supplies the extracted MBSFN request to the MBSFN transmission controller 120.

The MBSFN transmission controller 120 controls the MBSFN transmission in cooperation with the MCE 410. Specifically, when the MBSFN request is received from the MBSFN request extraction unit 117, the MBSFN transmission controller 120 transfers it to the MCE 410. In the case where performance conditions of the MBSFN transmission through the base station 100 satisfy a predetermined condition, the MBSFN transmission controller 120 notifies the measurement request generation unit 132 of peripheral base stations which perform the MBSFN transmission.

In the case where the reception quality indicated by the quality information produced from the quality information extraction unit 114 satisfies a predetermined condition, the MBSFN transmission controller 120 notifies the MBSFN control signal generation unit 131 of an instruction for causing the mobile station 300 to receive the MBMS data from other base stations. The MBSFN transmission controller 120 further requests the MCE 410 to stop the MBSFN transmission. When connected to the base station 100 and detecting that the number of the mobile stations which receive the MBMS data is reduced, the MBSFN transmission controller 120 may perform the same control as that at the time of receiving the MBSFN request.

According to the notification from the MBSFN transmission controller 120, the MBSFN control signal generation unit 131 generates a control signal indicating the instruction for causing the mobile station 300 to receive the MBMS data from other base stations. Based on the control parameters received from the MCE 410, the MBSFN control signal generation unit 131 further generates the MBSFN control signal used to receive the MBMS data. The MBSFN control signal generation unit 131 supplies the generated control signal to the mapping unit 135.

The measurement request generation unit 132 receives the notification from the MBSFN transmission controller 120 and generates a measurement request of reception quality toward the mobile station 300. The measurement request includes information indicating the base station which performs the MBSFN transmission among the peripheral base stations (e.g., other base stations existing in the same MBSFN area as that of the base station 100). The measurement request generation unit 132 supplies the generated measurement request to the mapping unit 135.

The synchronization signal generation unit 133 generates a synchronization signal (a primary synchronization signal and a secondary synchronization signal) corresponding to a cell ID given to a cell managed by the base station 100. The synchronization signal generation unit 133 supplies the generated synchronization signals to the mapping unit 135.

The RS generation unit 134 generates a reference signal as a known pilot signal. The RS generation unit 134 supplies the generated reference signal to the mapping unit 135.

The mapping unit 135 maps the MBMS data received from the MBMS gateway 520 and user data except the MBMS data received from the SAE gateway to the DL radio frame. The mapping unit 135 further maps to the DL radio frame the control parameters/control signals produced from the control parameter generation unit 116, MBSFN control signal generation unit 131, measurement request generation unit 132, synchronization signal generation unit 133, and RS generation unit 134. The mapping unit 135 sequentially supplies the mapped data to the coding and modulation unit 136.

The coding and modulation unit 136 error-correction codes and modulates the data produced from the mapping unit 135, and generates a baseband signal as a transmission signal to supply it to the radio transmitter 137. For the coding and modulation, the coding and modulation unit 136 uses the predetermined modulation and coding scheme or the modulation and coding scheme instructed by the scheduler 115.

The radio transmitter 137 radio-signal processes the transmission signal produced from the coding and modulation unit 136 and performs conversion (up-convert) from a low-frequency baseband signal to a high-frequency radio signal. For processing a radio signal, for example, the radio transmitter 137 has circuits such as a D/A (Digital to Analog) converter, a frequency converter, a BPF, and a power amplifier.

Figure 6:
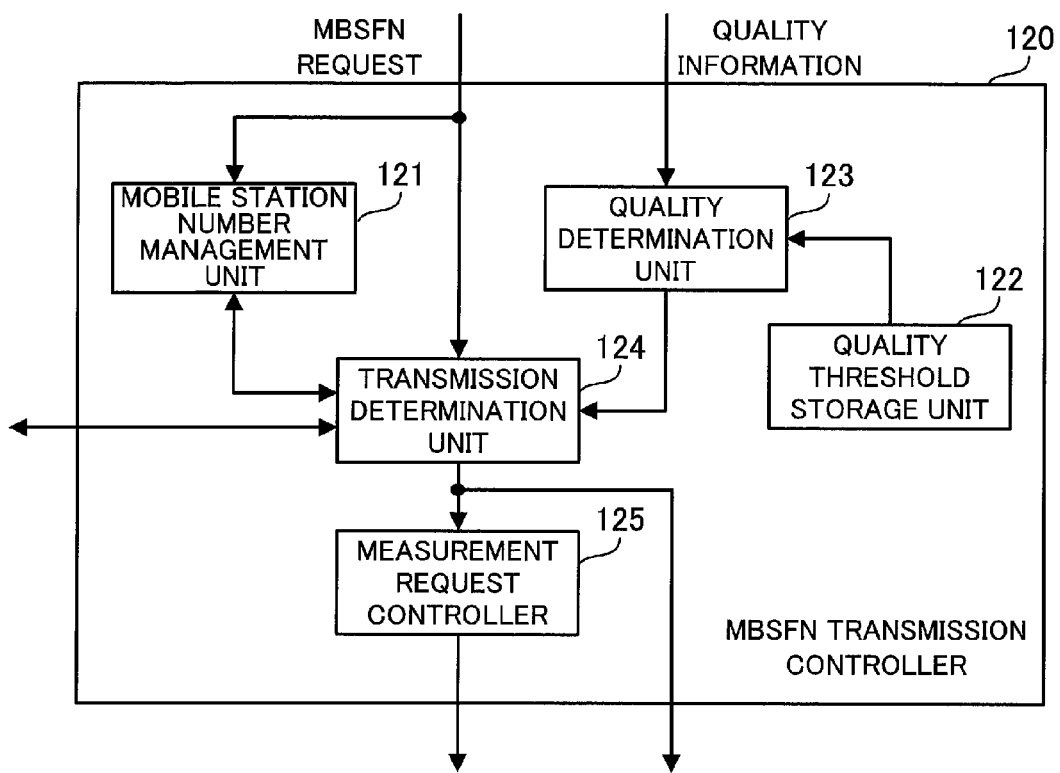
FIG. 6 is a block diagram illustrating an MBSFN transmission controller according to a second embodiment.

FIG. 6 is a block diagram illustrating the MBSFN transmission controller according to the second embodiment. The MBSFN transmission controller 120 has a mobile station number management unit 121, a quality threshold storage unit 122, a quality determination unit 123, a transmission determination unit 124, and a measurement request controller 125.

Among the mobile stations connected to the base station 100, the mobile station number management unit 121 manages the number of the mobile stations which receive the MBMS data from the base station 100. When the MBSFN request is produced from the MBSFN request extraction unit 117, the mobile station number management unit 121 increments the number of the mobile stations. On the other hand, when detecting that the mobile station connected to the base station 100 hands over to another cell or stops receiving the MBMS data, the mobile station number management unit 121 decrements the number of the mobile stations.

The quality threshold storage unit 122 stores a threshold of reception quality used to determine whether the mobile station 300 receives the MBMS data from other base stations.

When quality information on the MBSFN transmission is produced from the quality information extraction unit 114, the quality determination unit 123 compares the reception quality indicated by the quality information with the threshold stored in the quality threshold storage unit 122. At this time, in the case where the produced quality information is information indicating reception quality of each of the base stations which perform the MBSFN transmission, the quality determination unit 123 carries out statistical treatment of the indicated reception qualities and calculates reception quality of the entire two or more base stations, thereby comparing it with the threshold. The quality determination unit 123 then notifies the transmission determination unit 124 whether the reception quality is higher than or equal to the threshold.

When the MBSFN request is produced from the MBSFN request extraction unit 117, the transmission determination unit 124 transfers the MBSFN request to the MCE 410 and compares the number of the mobile stations managed by the mobile station number management unit 121 with the predetermined threshold. In the case where the number of the mobile stations is smaller than the threshold, the transmission determination unit 124 notifies the measurement request controller 125 that the measurement request is transmitted. When notified by the quality determination unit 123 that the reception quality is higher than or equal to the threshold, the transmission determination unit 124 then requests the MCE 410 to stop transmitting the MBMS data and notifies the MBSFN control signal generation unit 131 of an instruction for causing the mobile station 300 to receive the MBMS data from other base stations.

Specifically, when both the number of the mobile stations which receive the MBMS data and the reception quality satisfy the conditions, the transmission determination unit 124 controls the base station 100 not to transmit the MBMS data. On the other hand, when at least one of the number of the mobile stations and the reception quality does not satisfy the condition, the transmission determination unit 124 controls the base station 100 to transmit the MBMS data.

When detecting that the number of the mobile stations which receive the MBMS data is reduced, the transmission determination unit 124 compares the number of the mobile stations managed by the mobile station number management unit 121 with the predetermined threshold. In the case where the number of the mobile stations is smaller than the threshold, similarly when obtaining the MBSFN request, the transmission determination unit 124 controls the base station 100 not to transmit the MBMS data. At this time, in addition to the fact that the number of the mobile stations is smaller than the threshold, the reception quality may be set to be higher than or equal to the threshold as a condition. Further, the threshold used for control at the time of obtaining the MBSFN request and the threshold used for control at the time of detecting that the number of the mobile stations is reduced may be the same as each other or different from each other.

The measurement request controller 125 manages a base station which performs the MBSFN transmission among the peripheral base stations. The measurement request controller 125 receives the notification from the transmission determination unit 124, and notifies the measurement request generation unit 132 of the base station which performs the MBSFN transmission.

Figure 7:
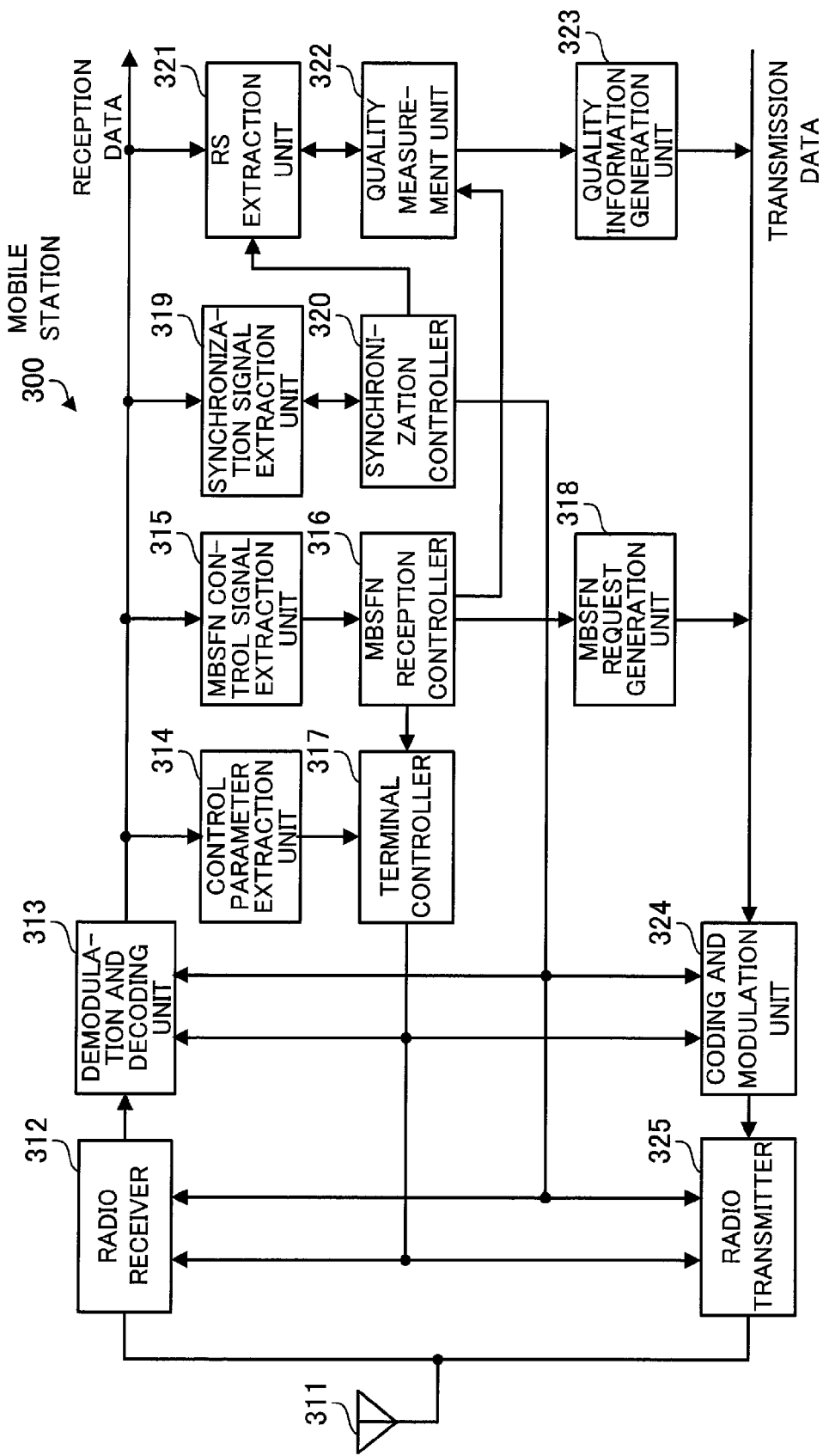
FIG. 7 is a block diagram illustrating a mobile station according to a second embodiment.

FIG. 7 is a block diagram illustrating the mobile station according to the second embodiment. The mobile station 300 includes the following elements: an antenna 311, a radio receiver 312, a demodulation and decoding unit 313, a control parameter extraction unit 314, an MBSFN control signal extraction unit 315, an MBSFN reception controller 316, a terminal controller 317, an MBSFN request generation unit 318, a synchronization signal extraction unit 319, a synchronization controller 320, an RS extraction unit 321, a quality measurement unit 322, a quality information generation unit 323, a coding and modulation unit 324, and a radio transmitter 325. Also, the other mobile stations are deployed by the same block structure as that of the mobile station 300.

The antenna 311 receives a radio signal transmitted by one or more base stations and supplies it to the radio receiver 312. On the other hand, the antenna 311 wirelessly outputs a transmission signal produced from the radio transmitter 325. In place of the antenna 311 used for both transmission and reception, a transmission antenna and a reception antenna may be separately provided on the mobile station 300. Diversity transmission may be further performed by using a plurality of antennas.

The radio receiver 312 radio-signal processes a signal produced from the antenna 311, and performs down conversion from a radio signal to a baseband signal. For processing a radio signal, for example, the radio receiver 312 has circuits such as an LNA, a frequency converter, a BPF, and an A/D converter.

The demodulation and decoding unit 313 demodulates and error-correction decodes the baseband signal produced from the radio receiver 312. The demodulation and decoding are performed by a scheme corresponding to a predetermined modulation and coding scheme or the modulation and coding scheme instructed by the terminal controller 317.

Here, in the case where the MBMS data transmitted by the MBSFN is received, a signal of the same content transmitted by a plurality of base stations is superimposed on the reception signal. That is, it is viewed from the mobile station 300 that an advance wave and a delay wave are superimposed. In this case, the radio receiver 312 extracts also a signal corresponding to a delay wave in which a delay time is smaller than or equal to a CP length. The demodulation and decoding unit 313 performs demodulation and decoding with respect to a signal obtained by combining the extracted signals from each base station.

The control parameter extraction unit 314 extracts the control parameters transmitted by the PDCCH (or, PDSCH). The control parameters include information indicating radio resources allocated for the PDSCH or PUSCH and information indicating the modulation and coding scheme applied to the above channels. The control parameter extraction unit 314 supplies the extracted control parameters to the terminal controller 317.

The MBSFN control signal extraction unit 315 extracts a control signal about the MBSFN. The herein extracted control signal includes a signal indicating a measurement request of the reception quality, a signal indicating the instruction for causing the mobile station 300 to receive the MBMS data from base stations except the connected base station, and the MBSFN control signal transmitted by the PMCH. The measurement request includes a signal indicating a base station which performs the MBSFN transmission. The MBSFN control signal includes radio resources used to transmit the MBMS data and a signal indicating the modulation and coding scheme applied to the MBMS data. The MBSFN control signal extraction unit 315 supplies the extracted control signal to the MBSFN reception controller 316.

When starting to receive the MBMS data, the MBSFN reception controller 316 instructs the MBSFN request generation unit 318 to transmit the MBSFN request. Based on the control signal produced from the MBSFN control signal extraction unit 315, the MBSFN reception controller 316 further controls reception processing of the MBMS data. Specifically, when obtaining the measurement request of reception quality, the MBSFN reception controller 316 notifies the quality measurement unit 322 of the base station which performs the MBSFN transmission and instructs the quality measurement unit 322 to perform the quality measurement. When obtaining a signal indicating the instruction for causing the mobile station 300 to receive the MBMS data or the MBSFN control signal from other base stations, the MBSFN reception controller 316 further notifies the terminal controller 317 of contents of the control signal, and instructs the terminal controller 317 to receive the MBMS data.

Based on the control parameters produced from the control parameter extraction unit 314, the terminal controller 317 controls transmission and reception of user data except the MBMS data. Based on the information notified of by the MBSFN reception controller 316, the terminal controller 317 further controls reception of the MBMS data. The terminal controller 317 then controls operations of the radio receiver 312, demodulation and decoding unit 313, coding and modulation unit 324, and radio transmitter 325.

The MBSFN request generation unit 318 receives the instruction from the MBSFN reception controller 316 and generates the MBSFN request, namely, control parameters indicating a start request of the MBSFN transmission. The MBSFN request generation unit 318 supplies the generated MBSFN request to the coding and modulation unit 324.

The synchronization signal extraction unit 319 extracts the synchronization signal (the primary synchronization signal and secondary synchronization signal) transmitted by the P-SCH and S-SCH, and supplies it to the synchronization controller 320.

Based on the synchronization signal produced from the synchronization signal extraction unit 319, the synchronization controller 320 detects timing about a radio frame. The synchronization controller 320 then notifies of the detected timing the radio receiver 312, demodulation and decoding unit 313, RS extraction unit 321, coding and modulation unit 324, and radio transmitter 325, and feeds back it to the synchronization signal extraction unit 319.

The RS extraction unit 321 extracts a reference signal included in the DL radio frame, and supplies the extracted reference signal to the quality measurement unit 322.

By using the reference signal produced from the RS extraction unit 321, the quality measurement unit 322 measures reception quality (or, radio channel quality) such as a CIR. When the base station is notified of by the MBSFN reception controller 316, the quality measurement unit 322 measures the reception quality about the base station notified of. The quality measurement unit 322 supplies the measurement result to the quality information generation unit 323 and feeds back it to the RS extraction unit 321.

The reception quality of the base station which performs the MBSFN transmission may be measured by using the reference signal included in a normal subframe, or by using the reference signal included in an MBSFN subframe. In the former case, the reception quality in each base station may be measured. In the latter case, the reception quality of the entire two or more base stations which perform the MBSFN transmission may be measured. In the case where the base station to which the mobile station 300 is connected performs the MBSFN transmission, the quality measurement unit 322 may further measure the reception quality on the MBSFN transmission of the connected base station.

The quality information generation unit 323 generates quality information being control parameters indicating the reception quality measured by the quality measurement unit 322. Examples of the quality information include a CQI (Channel Quality Indication) in which the reception quality is indicated by a discrete value. The quality information generation unit 323 supplies the generated quality information to the coding and modulation unit 324. The quality information may be information indicating the reception quality in each base station, or information indicating reception quality of the entire base stations which perform the MBSFN transmission. In the latter case, the quality information generation unit 323 may carry out statistical treatment of the reception qualities measured in respective base stations, and calculate the entire reception quality.

The coding and modulation unit 324 error-correction codes and modulates the user data, MBSFN request, and quality information to be transmitted by the PUSCH, and maps them to the UL radio resource allocated to the mobile station 300. For the coding and modulation, the coding and modulation unit 324 uses the predetermined modulation and coding scheme or the modulation and coding scheme instructed by the terminal controller 317. The coding and modulation unit 324 supplies the baseband signal as a transmission signal to the radio transmitter 325.

The radio transmitter 325 radio-signal processes the transmission signal produced from the coding and modulation unit 324 and performs up-conversion from a baseband signal to a radio signal. For processing a radio signal, for example, the radio transmitter 325 has circuits such as a D/A converter, a frequency converter, a BPF, and a power amplifier.

Figure 8:
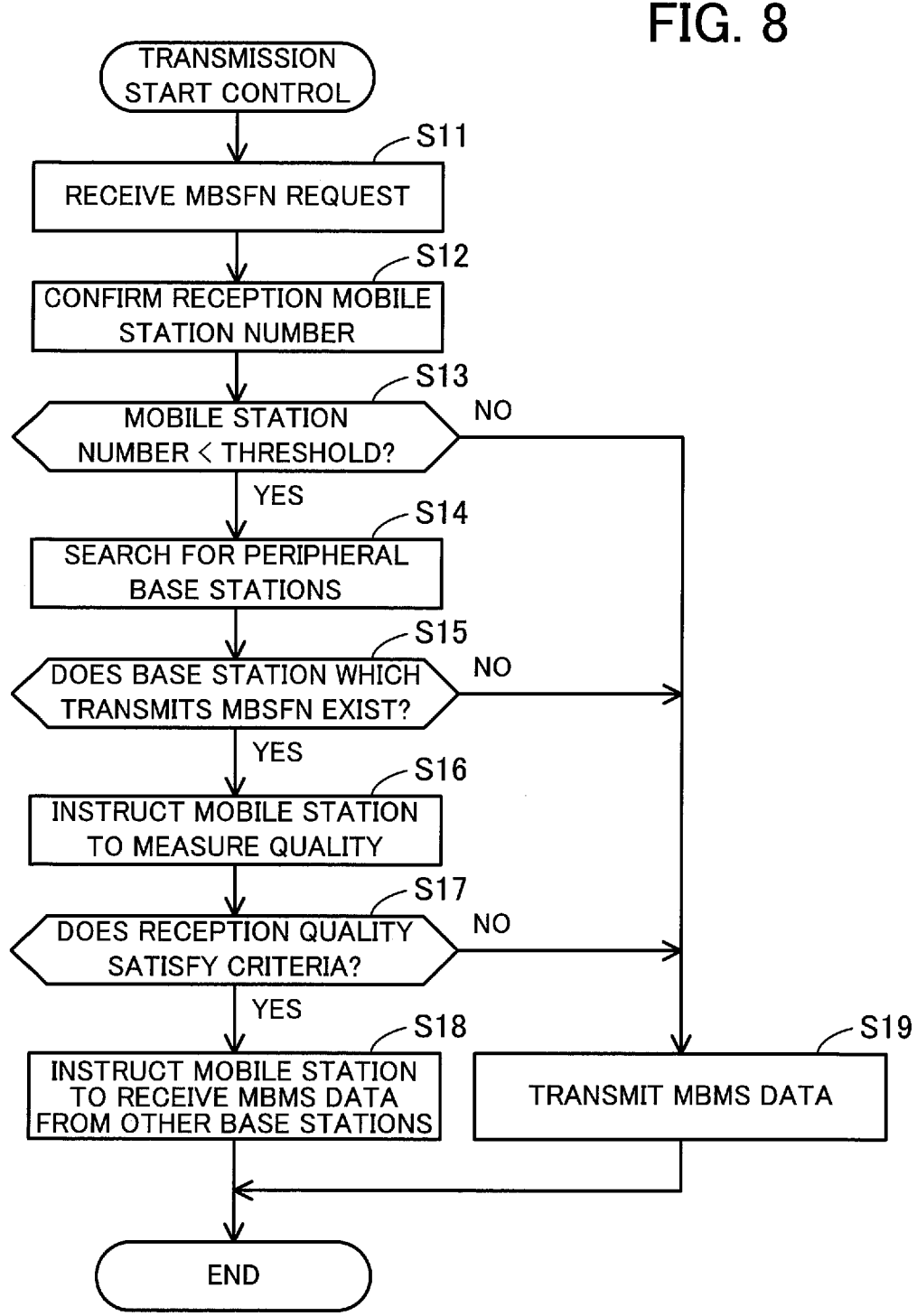
FIG. 8 is a flowchart illustrating transmission start control according to a second embodiment.

FIG. 8 is a flowchart illustrating the transmission start control according to the second embodiment. The control process illustrated in FIG. 8 includes the following steps:

(Step S11) The base station 100 receives the MBSFN request from the mobile station 300.

(Step S12) Among mobile stations connected to the base station 100, the transmission determination unit 124 confirms the number of the mobile stations which receive the MBMS data from the base station 100.

(Step S13) The transmission determination unit 124 determines whether the number of the mobile stations confirmed at step S12 is smaller than a predetermined threshold. If so, the process advances to step S14. If not, the process proceeds to step S19.

(Step S14) Among peripheral base stations (e.g., a plurality of base stations included in the same MBSFN area as that of the base station 100), the measurement request controller 125 searches for a base station which performs the MBSFN transmission. Note that the searched-for base station may be limited to a base station which transmits the same MBMS data as that requested by the mobile station 300.

(Step S15) The measurement request controller 125 determines whether a base station which performs the MBSFN transmission exists. If so, the process advances to step S16. If not, the process proceeds to step S19. At this time, only in the case where the number of the base stations which perform the MBSFN transmission is two or more (or, a predetermined number greater than two), the process may advance to step S16. If not, the process may proceed to step S19.

(Step S16) The base station 100 transmits to the mobile station 300 a measurement request including information indicating a base station which performs the MBSFN transmission. The base station 100 then receives quality information on the base station notified of from the mobile station 300.

(Step S17) The quality determination unit 123 determines whether reception quality indicated by the quality information from the mobile station 300 satisfies criteria, namely, the mobile station 300 receives the MBMS data from base stations except the base station 100. If so, the process advances to step S18. If not, the process proceeds to step S19.

(Step S18) The base station 100 notifies the mobile station 300 that the MBMS data is received from other base stations which perform the MBSFN transmission. At this time, the base station 100 may not have to transmit the MBMS data requested by the mobile station 300.

(Step S19) The base station 100 transmits the MBMS data requested by the mobile station 300. The mobile station 300 receives the MBMS data also from the base station 100.

Through the above steps, even in the case where the MBSFN request is received from the mobile station 300, when the number of subordinate mobile stations which receive the MBMS data is smaller than a threshold and reception quality of the mobile station 300 is greater than or equal to the threshold, the base station 100 does not transmit the requested MBMS data. In the case where the MBMS data requested by the mobile station 300 is already transmitted, the base station 100 may continue to transmit the MBMS data regardless of the number of the mobile stations.

Figure 9:
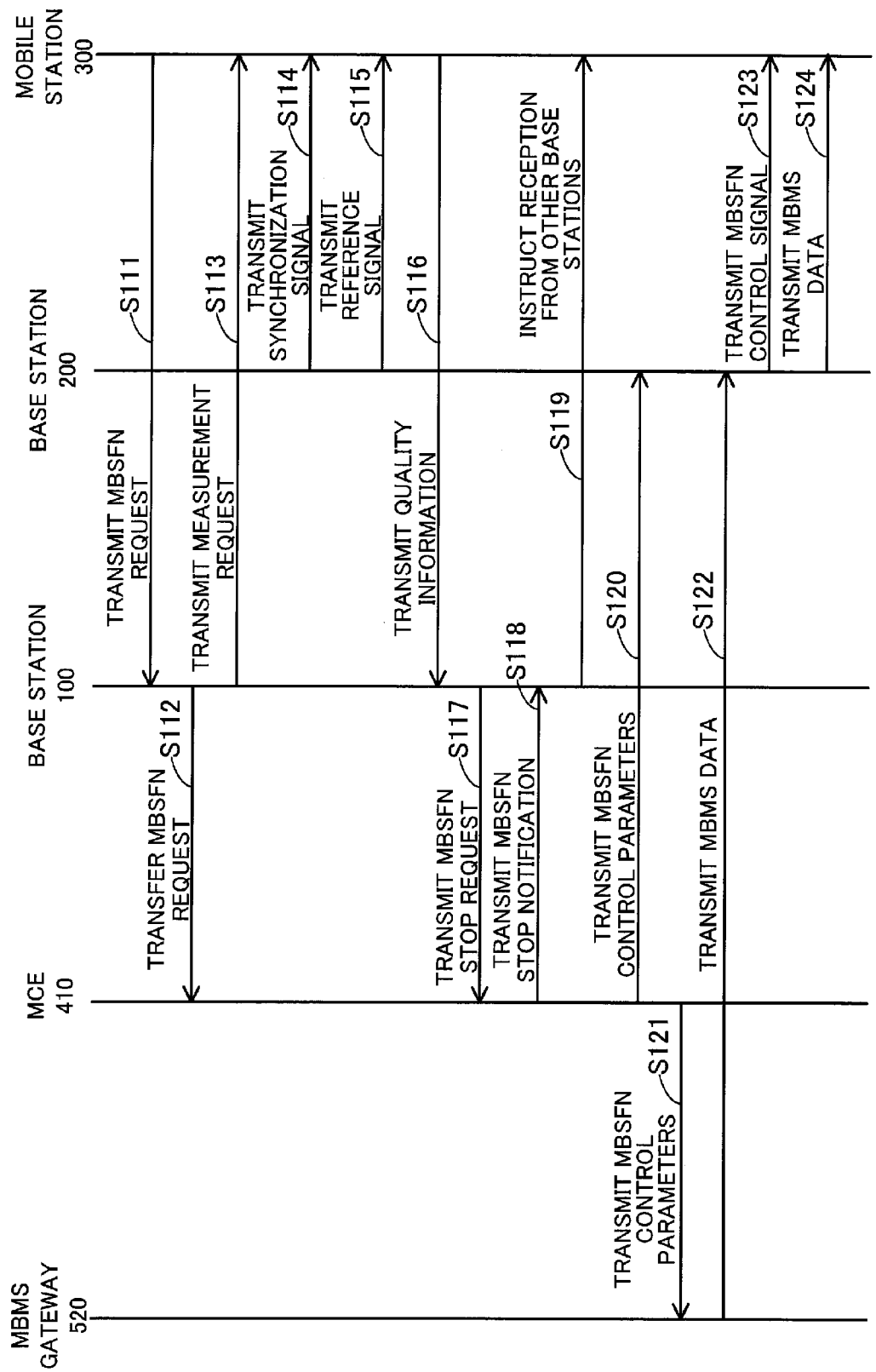
FIG. 9 is a sequence diagram illustrating a flow of a transmission start according to a second embodiment.

FIG. 9 is a sequence diagram illustrating a flow of a transmission start according to the second embodiment. The following section will now discuss the case where the base station 200 performs MBSFN transmission and the base station 100 does not transmit the requested MBMS data. The process illustrated in FIG. 9 includes the following steps:

(Step S111) The mobile station 300 transmits an MBSFN request to the base station 100.

(Step S112) The base station 100 transfers the MBSFN request to the MCE 410.

(Step S113) The base station 100 confirms that performance conditions of the MBSFN transmission of its own station satisfy a predetermined condition, and transmits a measurement request to the mobile station 300. In the measurement request, information indicating base stations (at least including the base station 200) which perform the MBSFN transmission is included. Note that processes of steps S112 and S113 may be performed in reverse.

(Step S114) The base station 200 transmits a synchronization signal through the DL radio frame. The mobile station 300 synchronizes with the base station 200 by using the received synchronization signal.

(Step S115) The base station 200 transmits a reference signal through the DL radio frame. The mobile station 300 measures reception quality about the MBSFN transmission by using the received reference signal. In the case where notified by the base station 100 of a plurality of base stations, the mobile station 300 may perform processes of steps S114 and S115 for each of the base station notified of.

(Step S116) The mobile station 300 transmits quality information indicating the reception quality about the MBSFN transmission measured at step S115 to the base station 100.

(Step S117) The base station 100 confirms that the reception quality about the MBSFN transmission satisfies a predetermined condition, and transmits to the MCE 410 an MBSFN stop request indicating that its own station does not transmit the MBMS data requested by the mobile station 300.

(Step S118) The MCE 410 transmits to the base station 100 an MBSFN stop notification as a response to the MBSFN stop request.

(Step S119) The base station 100 instructs the mobile station 300 to receive the MBMS data from other base stations. Note that transmission of the MBSFN stop request of step S117 and the process of step S119 may be performed in reverse. Further, before receiving the MBSFN stop notification of step S118, the process of step S119 may be performed.

(Step S120) The MCE 410 transmits control parameters (e.g., information indicating radio resources or modulation and coding scheme used to transmit the MBMS data) on the MBMS data requested by the mobile station 300 to base stations, including the base station 200, which perform the MBSFN transmission.

(Step S121) The MCE 410 transmits to the MBMS gateway 520 the control parameters (e.g., information indicating a base station which transmits the MBMS data) on the MBMS data requested by the mobile station 300.

(Step S122) The MBMS gateway 520 transmits the MBMS data to the base stations which include the base station 200 and perform the MBSFN transmission.

(Step S123) Based on the MBSFN control parameters received at step S120, the base station 200 generates an MBSFN control signal and transmits it through the MBSFN subframe.

(Step S124) The base station 200 transmits the MBMS data received at step S122 through the MBSFN subframe.

Figure 10:
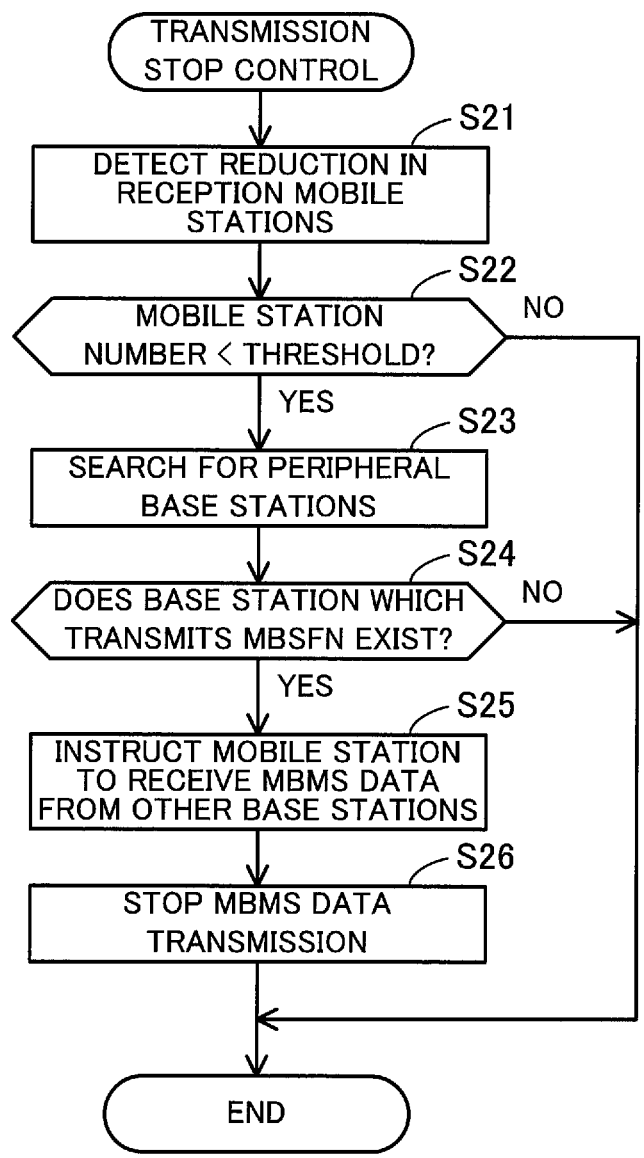
FIG. 10 is a first flowchart illustrating transmission stop control according to a second embodiment.

FIG. 10 is a first flowchart illustrating transmission stop control according to the second embodiment. It is assumed here that the mobile station 300 receives the MBMS data from the base station 100. The control process illustrated in FIG. 10 includes the following steps:

(Step S21) Among the mobile stations connected to the base station 100, the transmission determination unit 124 detects that the number of the mobile stations which receive the MBMS data from the base station 100 is reduced.

(Step S22) The transmission determination unit 124 determines whether the reduced number of the mobile stations is smaller than a predetermined threshold. If so, the process proceeds to step S23. If not, the process ends.

(Step S23) Among the peripheral base stations, the measurement request controller 125 searches for a base station which currently performs the MBSFN transmission. The searched-for base station may be limited to a base station which transmits the same MBMS data as that received by the mobile station 300.

(Step S24) The measurement request controller 125 determines whether a base station which performs the MBSFN transmission exists. If so, the process proceeds to step S25. If not, the process ends. At this time, the number of the base stations which perform the MBSFN transmission may be set to two or more (or, a predetermined number greater than two) as a condition.

(Step S25) The base station 100 notifies the mobile station 300 that the MBMS data is received from other base stations which perform the MBSFN transmission.

(Step S26) The base station 100 stops transmitting the MBMS data received from its own station by the mobile station 300.

Through the above steps, when the number of the mobile stations is smaller than the threshold, the transmission of the MBMS data is supposed to be stopped. On the other hand, as described above, when the number of the mobile stations is smaller than the threshold and the reception quality of the mobile station 300 is higher than or equal to the threshold, the transmission of the MBMS data may be stopped.

Figure 11:
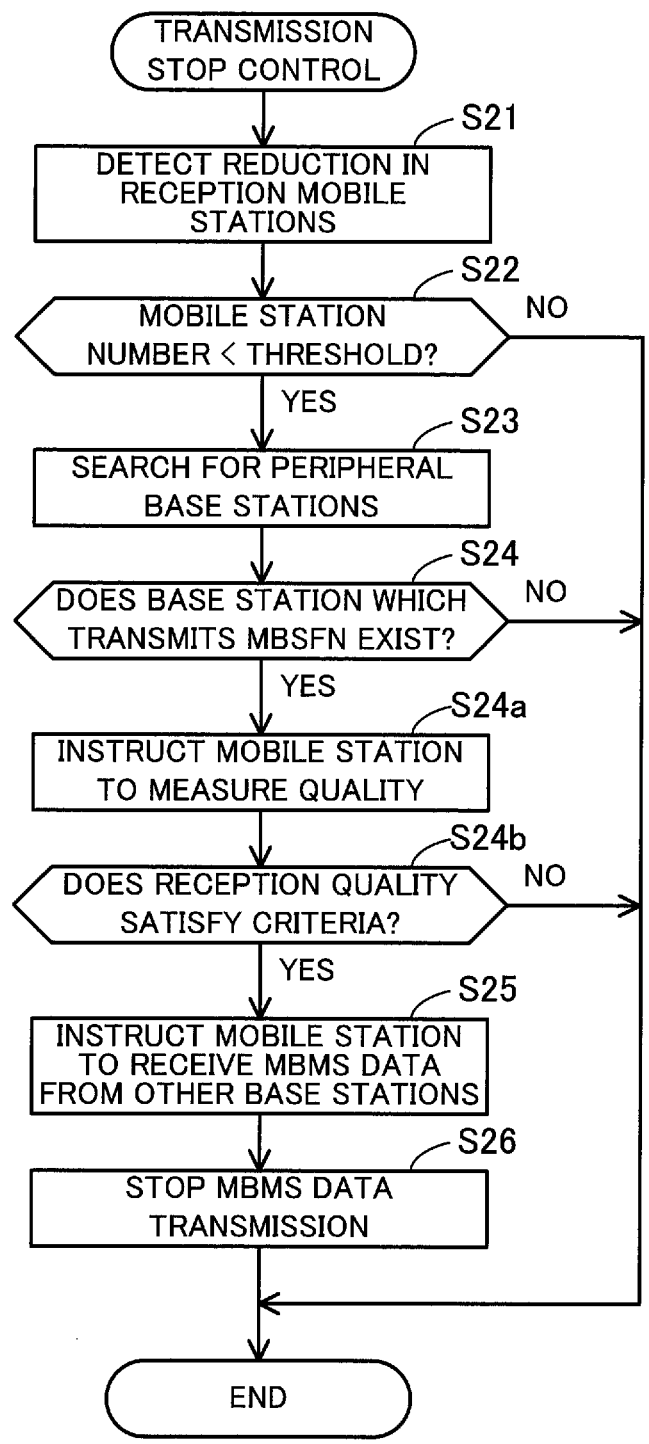
FIG. 11 is a second flowchart illustrating transmission stop control according to a second embodiment.

FIG. 11 is a second flowchart illustrating the transmission stop control according to the second embodiment. In a control process illustrated in FIG. 11, steps S24a and S24b as described below are performed between the steps S24 and S25 of the control process illustrated in FIG. 10.

(Step S24a) The base station 100 transmits to the mobile station 300 a measurement request including information indicating the base station which performs the MBSFN transmission. The base station 100 then receives quality information on the base station notified of, from the mobile station 300.

(Step S24b) The quality determination unit 123 determines whether the reception quality indicated by the quality information received from the mobile station 300 satisfies criteria. If so, the process proceeds to step S25. If not, the process ends.

Specifically, when the number of subordinate mobile stations which receive the MBMS data is smaller than the threshold, the base station 100 stops receiving the MBMS data. Or alternatively, in the case where the number of the mobile stations is smaller than the threshold and the reception quality of the mobile stations which receive the MBMS data is higher than or equal to the threshold, the base station 100 stops transmitting the MBMS data. In the case where a plurality of mobile stations receive the MBMS data, determination whether transmission of step S24b is stopped may be performed with respect to each of the plurality of mobile stations, or with respect to the plurality of mobile stations as a whole. In the latter case, for example, the reception quality of all the mobile stations is supposed to satisfy the criteria as a condition.

Figure 12:
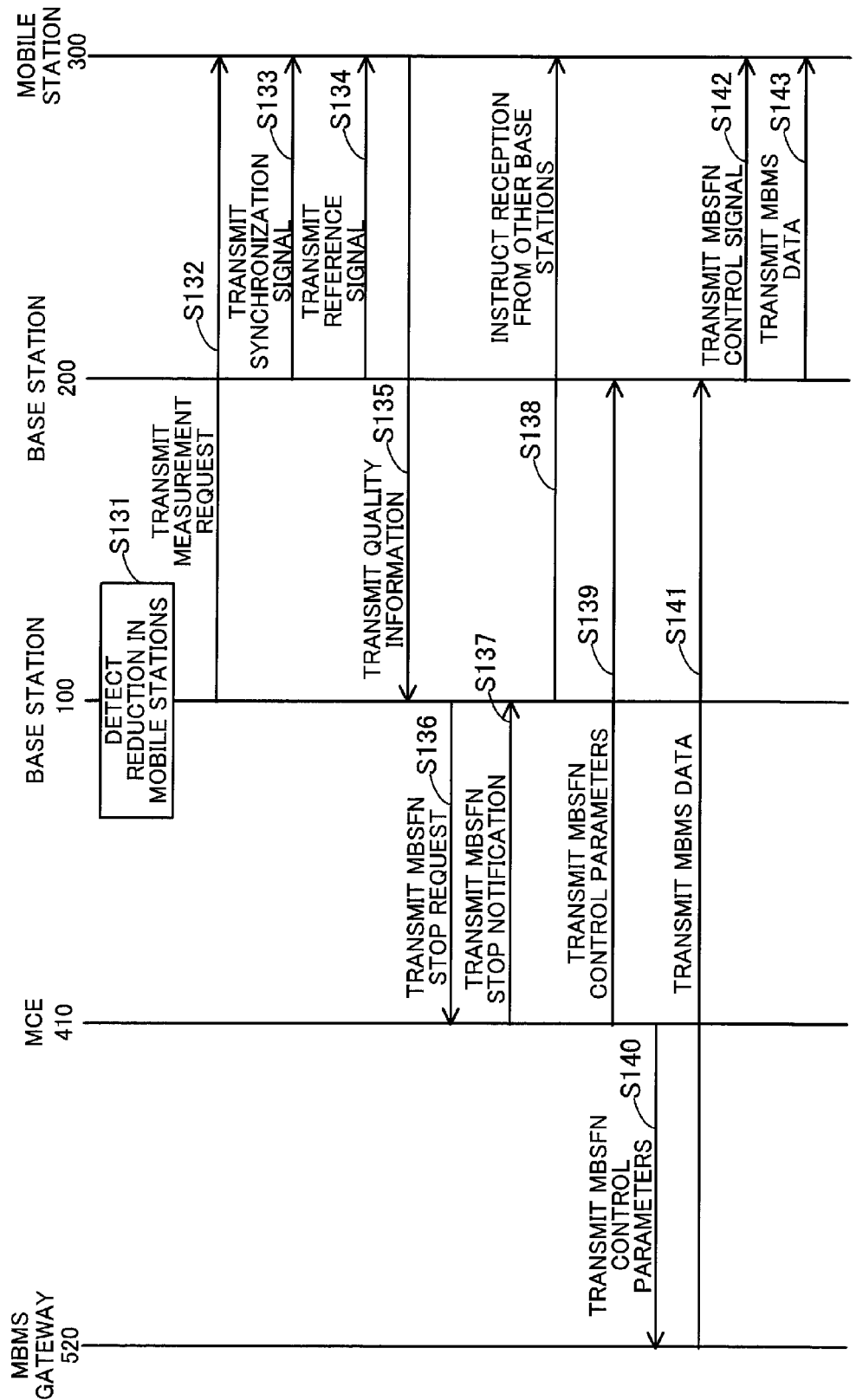
FIG. 12 is a sequence diagram illustrating a flow of a transmission stop according to a second embodiment.

FIG. 12 is a sequence diagram illustrating a flow of the transmission stop according to the second embodiment. The following section will now discuss the case where the base station 200 performs the MBSFN transmission and the base station 100 stops transmitting the MBMS data according to the control process illustrated in FIG. 11. The sequence illustrated in FIG. 12 includes the following steps:

(Step S131) The base station 100 detects that the number of the mobile stations which receive the MBMS data from the base station 100 is reduced, among the mobile stations connected to its own station.

(Step S132) The base station 100 confirms that performance conditions of the MBSFN transmission of its own station satisfy a predetermined condition, and transmits a measurement request to the mobile station 300. In the measurement request, information indicating the base stations (including at least the base station 200) which perform the MBSFN transmission is included.

(Step S133) The base station 200 transmits a synchronization signal through the DL radio frame. The mobile station 300 synchronizes with the base station 200 by using the received synchronization signal.

(Step S134) The base station 200 transmits a reference signal through the DL radio frame. The mobile station 300 measures the reception quality about the MBSFN transmission by using the received reference signal.

(Step S135) The mobile station 300 transmits to the base station 100 quality information indicating the reception quality about the MBSFN transmission measured at step S134.

(Step S136) The base station 100 confirms that the reception quality about the MBSFN transmission satisfies a predetermined condition, and transmits to the MCE 410 an MBSFN stop request indicating that its own station stops transmitting the MBMS data.

(Step S137) The MCE 410 transmits to the base station 100 an MBSFN stop notification as a response to the MBSFN stop request.

(Step S138) The base station 100 instructs the mobile station 300 to receive the MBMS data from other base stations. Note that transmission of the MBSFN stop request of step S136 and the process of step S138 may be performed in reverse. Further, before receiving the MBSFN stop notification of step S137, the process of step S138 may be performed.

(Step S139) To base stations which include the base station 200 and perform the MBSFN transmission, the MCE 410 transmits the control parameters (e.g., information indicating radio resources or modulation and coding scheme used to transmit the MBMS data) on the MBMS data received by the mobile station 300.

(Step S140) The MCE 410 transmits to the MBMS gateway 520 the control parameters (e.g., information indicating a base station which transmits the MBMS data) on the MBMS data received by the mobile station 300.

(Step S141) The MBMS gateway 520 transmits the MBMS data to the base stations which include the base station 200 and perform the MBSFN transmission.

(Step S142) Based on the MBSFN control parameters received at step S139, the base station 200 generates an MBSFN control signal and transmits it through the MBSFN subframe.

(Step S143) The base station 200 transmits the MBMS data received at step S141 through the MBSFN subframe.

Incidentally, in the sequences illustrated in FIGS. 9 and 12, when the base station 100 does not transmit the MBMS data, the mobile station 300 receives the MBSFN control signal from the base station 200. However, the mobile station 300 receives the MBSFN control signal and the user data except the MBMS data from any of the base stations. With regard to the above matter, several options are considered as described below.

Figure 13:
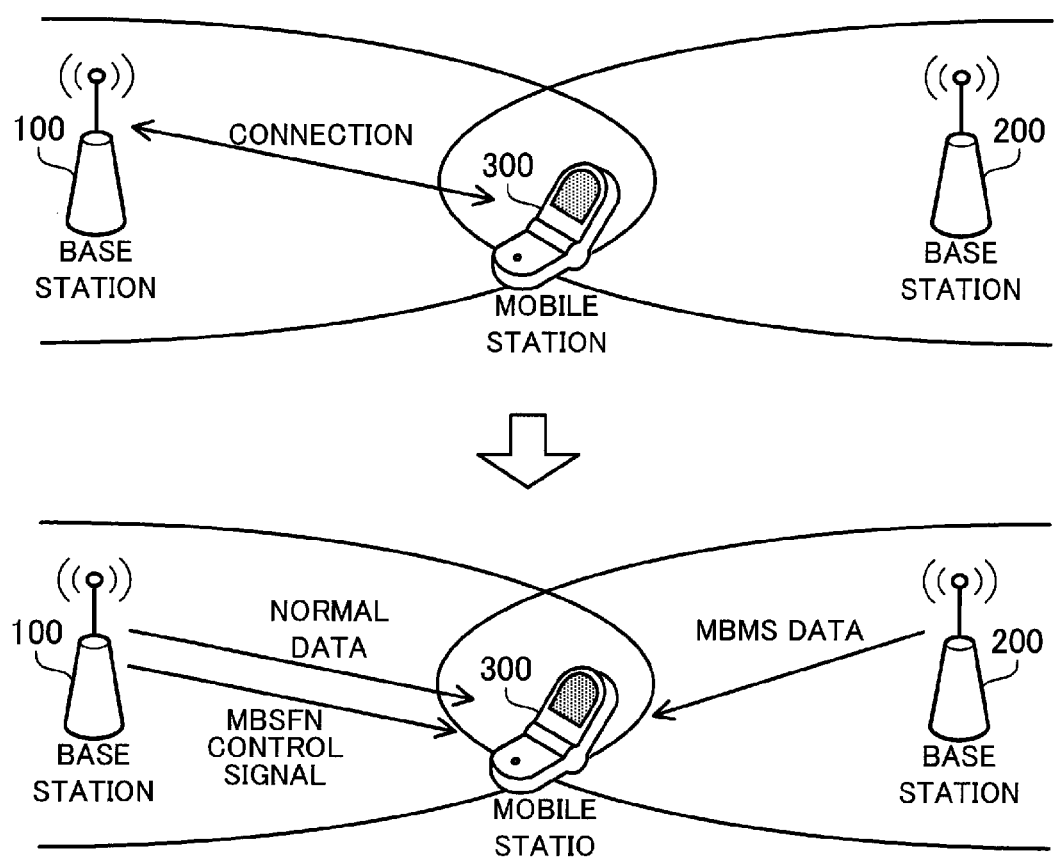
FIG. 13 is a first diagram illustrating a relationship between a plurality of base stations and a mobile station.

FIG. 13 is a first diagram illustrating a relationship between a plurality of base stations and a mobile station. As illustrated in FIG. 13, the mobile station 300 is connected to the base station 100 and receives the MBMS data from the base station 200 while receiving an instruction from the base station 100. At this time, the mobile station 300 receives the MBSFN control signal from the base station 100. The mobile station 300 further receives user data (normal data) except the MBMS data from the base station 100. That is, in the example of FIG. 13, while keeping connection to the base station 100, the mobile station 300 receives only the MBMS data from base stations except the base station 100.

Figure 14:
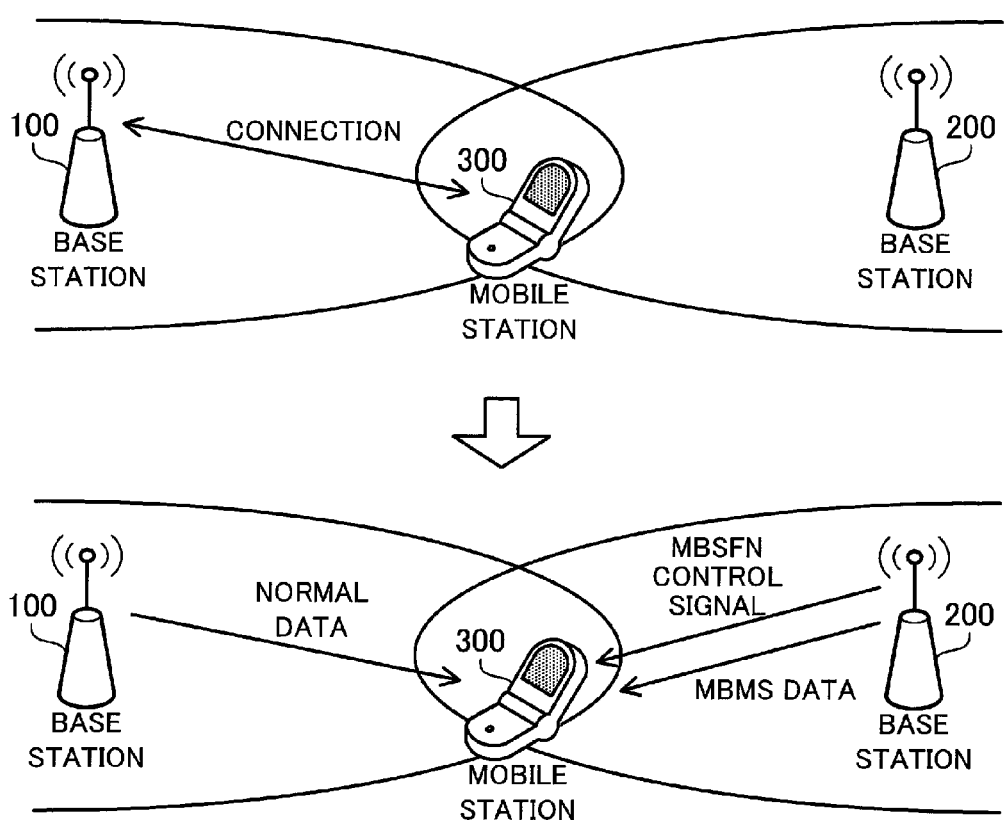
FIG. 14 is a second diagram illustrating a relationship between a plurality of base stations and a mobile station.

FIG. 14 is a second diagram illustrating a relationship between a plurality of base stations and a mobile station. As illustrated in FIG. 14, the mobile station 300 is connected to the base station 100 and receives the MBMS data from the base station 200 while receiving an instruction from the base station 100. At this time, the mobile station 300 receives also the MBSFN control signal from the base station 200. On the other hand, the mobile station 300 receives user data except the MBMS data from the base station 100. That is, in the example of FIG. 14, while keeping connection to the base station 100, the mobile station 300 receives only the MBMS data and MBSFN control signal from base stations except the base station 100.

Figure 15:
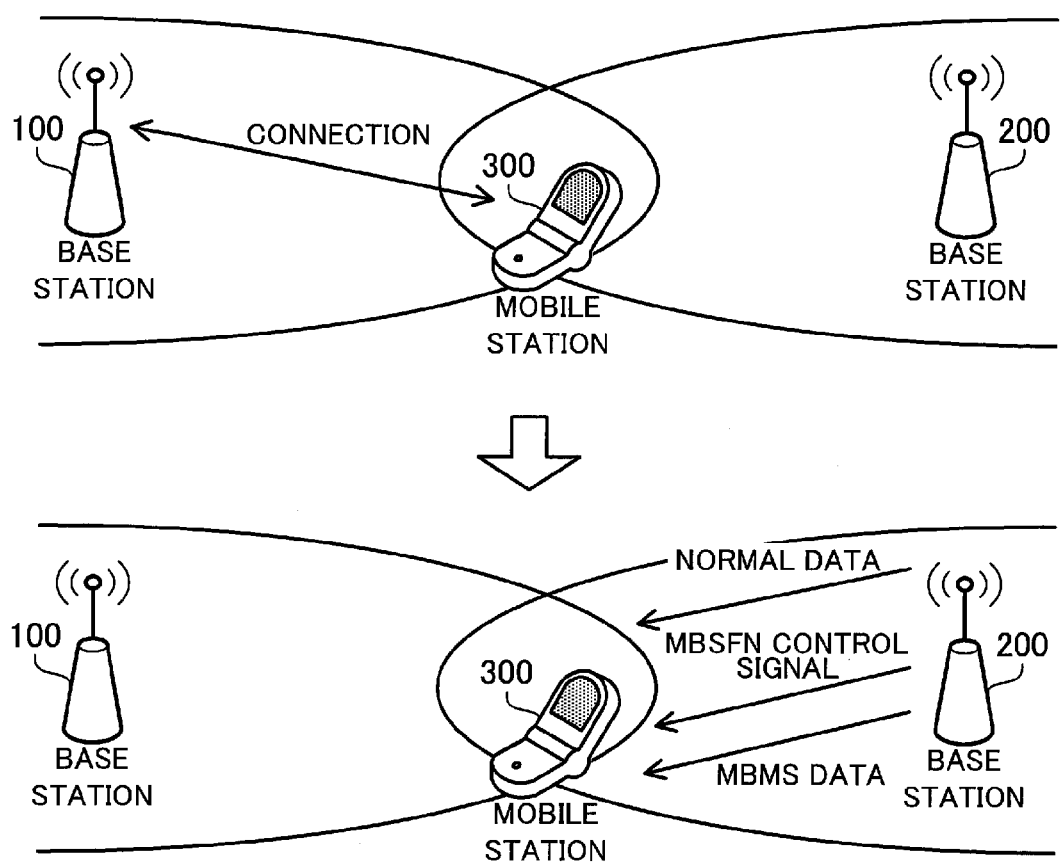
FIG. 15 is a third diagram illustrating a relationship between a plurality of base stations and a mobile station.

FIG. 15 is a third diagram illustrating a relationship between a plurality of base stations and a mobile station. As illustrated in FIG. 15, the mobile station 300 is connected to the base station 100, and receives the MBMS data from the base station 200 while receiving the instruction from the base station 100. At this time, the mobile station 300 receives from the base station 200 the MBSFN control signal and also user data except the MBMS data. That is, in the example of FIG. 15, the mobile station 300 switches (hands over) a connection destination from the base station 100 to the base station 200. As a base station being a handover destination, for example, a base station having highest reception quality may be selected in the mobile station 300 from among the base stations which perform the MBSFN transmission.

Through the above-described control, some base stations stop transmitting the MBMS data from among a plurality of base stations which exist in an MBSFN area.

Figure 16:
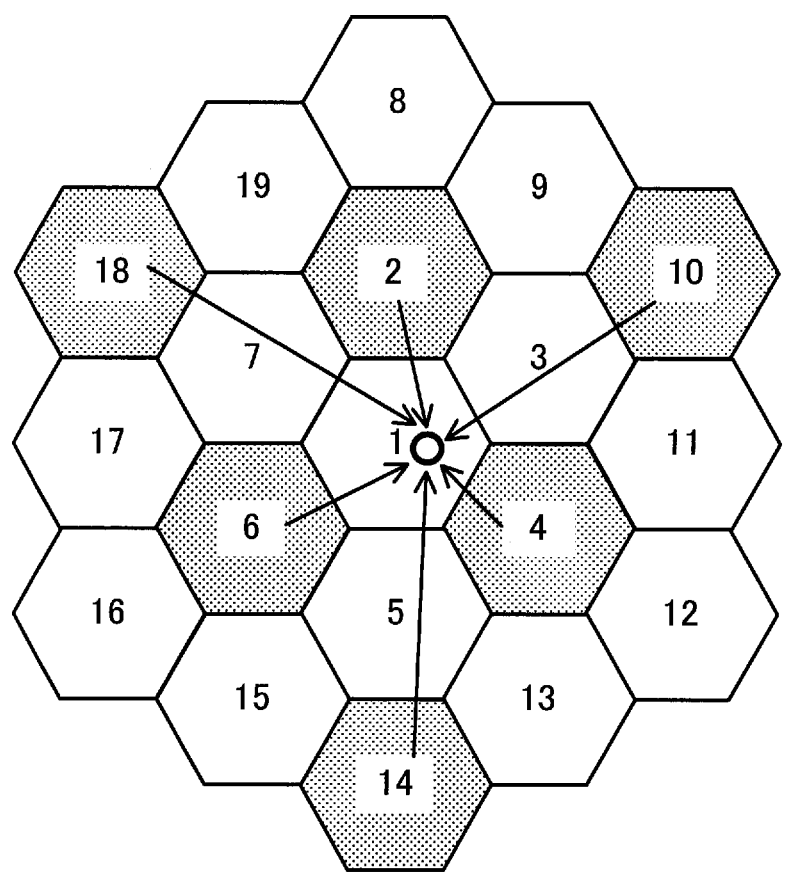
FIG. 16 illustrates an example of an MBSFN area.

FIG. 16 illustrates an example of an MBSFN area. In this example, cells #1 to #19 are included in the MBSFN area. The cell #1 is a cell managed by the base station 100 and the mobile station 300 exists in the cell #1. Among the cells #1 to #1, the cells #2, #4, #6, #10, #14, and #18 transmit the MBMS data received by the mobile station 300, and the other cells do not transmit the MBMS data. The mobile station 300 combines and demodulates radio signals from the cells #2, #4, #6, #10, #14, and #18, thereby extracting the MBMS data.

Here, think of utilization efficiency of radio resources. As described above, since the MBSFN subframe and the normal subframe are different in the structure, the MBMS data and user data except the MBMS data are not transmitted through the same subframe. Therefore, in the case where the amount of the MBMS data to be transmitted is small, empty radio resources unused in the MBSFN subframe are generated and utilization efficiency thereof is reduced. The number of the base stations which perform the MBSFN transmission is suppressed, thereby alleviating this problem.

Suppose, for example, that before performing stop control of the MBSFN transmission, the MBSFN subframe is transmitted in all the cells #1 to #19. Ten mobile stations which receive the MBSFN subframe are supposed to exist in the cells #2, #4, #6, #10, #14, and #18, respectively, and one mobile station which receives the MBSFN subframe is supposed to exist in the other cells, respectively. In this case, in the subframe of one timing point, mobile stations of 73 pieces=6 cells×10 pieces+13 cells×1 piece are accommodated in the entire area.

On the other hand, after performing stop control of the MBSFN transmission, the MBSFN subframe is supposed to be continuously transmitted in the cells #2, #4, #6, #10, #14, and #18. On the other hand, transmission of the MBSFN subframe is supposed to be stopped in the other cells. Further, mobile stations existing in the cell in which the MBSFN transmission is stopped are supposed to receive the MBSFN subframe from the cells #2, #4, #6, #10, #14, and #18.

Suppose further that in the cell in which the MBSFN transmission is stopped, a normal subframe is transmitted in place of the MBSFN subframe. The normal subframe is supposed to be capable of accommodating ten mobile stations which receive user data except the MBMS data. In this case, in addition to the 73 mobile stations which receive the MBMS data, the subframe of one timing point accommodates mobile stations of 130 pieces=13 cells×10 pieces in the entire area. In the above-described example, when stop control of the MBSFN transmission is performed, the number of mobile stations which are capable of being accommodated through a subframe of certain timing point increases to about 2.8 times.

For more suppressing the number of the base stations which perform the MBSFN transmission, the mobile station 300 preferably receives the MBMS data from a farther base station. To cope with the above problem, think of a method in which the base station which performs the MBSFN transmission increases transmission power of the MBSFN subframe.

Figure 17:
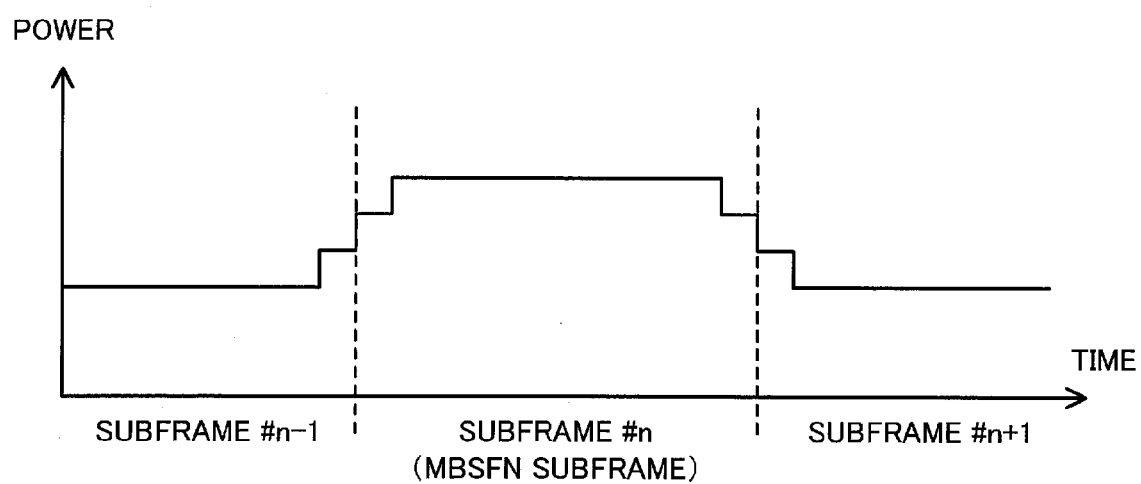
FIG. 17 illustrates transmission power control of a base station.

FIG. 17 illustrates transmission power control of the base station. In FIG. 17, subframes #n−1 and #n+1 are normal subframes and a subframe #n is an MBSFN subframe. A base station which transmits these subframes transmits the subframes #n−1 and #n+1 by using normal transmission power, and on the other hand, transmits the subframe #n by using transmission power greater than the normal transmission power. At this time, in a boundary between the subframes #n−1 and #n and between the subframes #n and #n+1, transmission power may be stepwise changed. Through the process, generation of noises is suppressed as compared with the case where transmission power is rapidly changed. When a high frequency component of transmission signals is removed by using a cosine filter with respect to the transmission signals, generation of noises is further suppressed.

Figure 18:
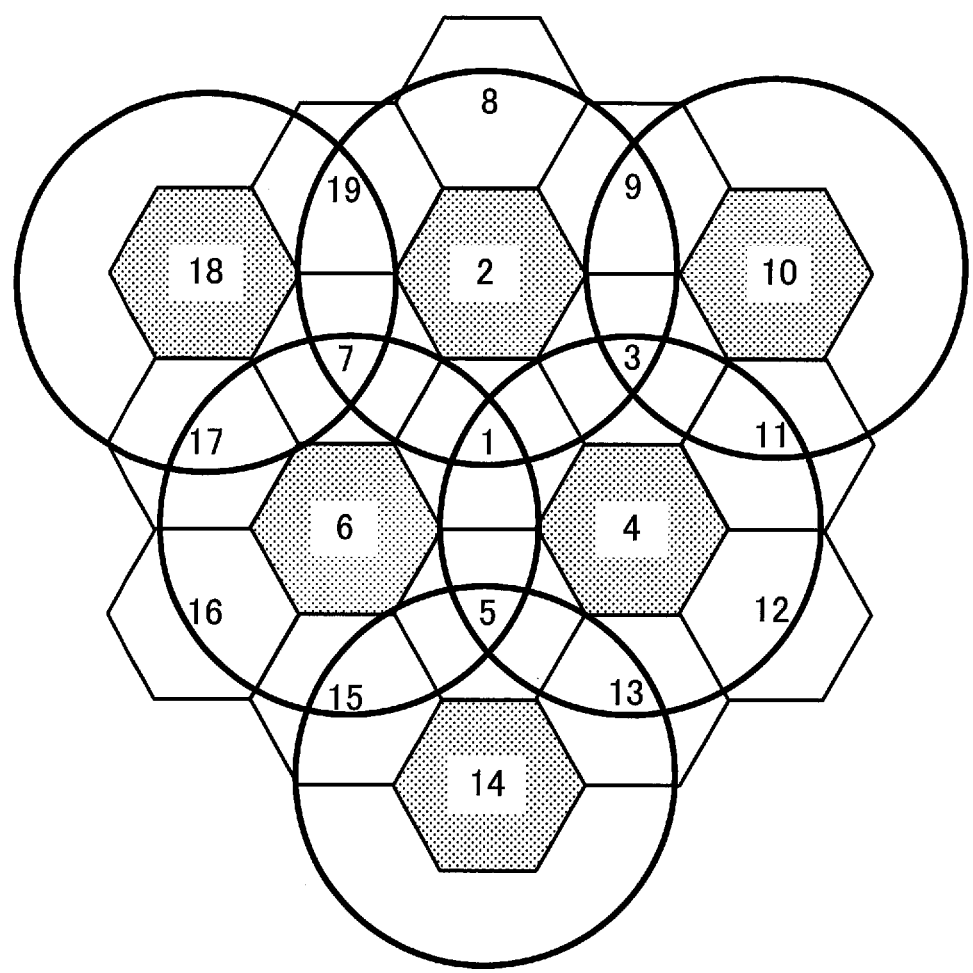
FIG. 18 is another diagram illustrating an example of an MBSFN area.

FIG. 18 is another diagram illustrating an example of the MBSFN area. In the case where transmission power of the MBSFN subframe is greater than that of the normal subframe, cell radius of peripheral cells are viewed to be long from the mobile station 300 only at the time of performing the MBSFN transmission. As a result, the mobile station 300 receives the MBMS data from a plurality of base stations and improves the reception quality.

According to the above-described mobile communication system of the second embodiment, when the number of subordinate mobile stations which receive the MBMS data is small and the subordinate mobile stations are capable of receiving the MBMS data from other base stations, the base station 100 stops transmitting the MBSFN. Therefore, the base station 100 provides an MBSFN area in which base stations which perform the MBSFN transmission and base stations which do not perform the MBSFN transmission mixedly exist, and improves utilization efficiency of radio resources. Further, the base station 100 smoothly controls the mobile station 300 to receive the MBMS data from base stations which perform the MBSFN transmission.

(Third Embodiment)

A third embodiment will be described below. Since the third embodiment shares some elements with the foregoing second embodiment, the following discussion will focus on their distinctive points, omitting explanations of similar elements. A mobile communication system according to the third embodiment differs from that of the second embodiment in a method for determining whether to perform MBSFN transmission through a base station.

The mobile communication system according to the third embodiment is deployed by using the same system configuration as that of the second embodiment illustrated in FIG. 2. Further, a base station and mobile station according to the third embodiment are deployed by using the same block configurations as those of the second embodiment illustrated in FIGS. 5 and 7. Note that an MBSFN transmission controller 140 described below is used in place of the MBSFN transmission controller 120.

Figure 19:
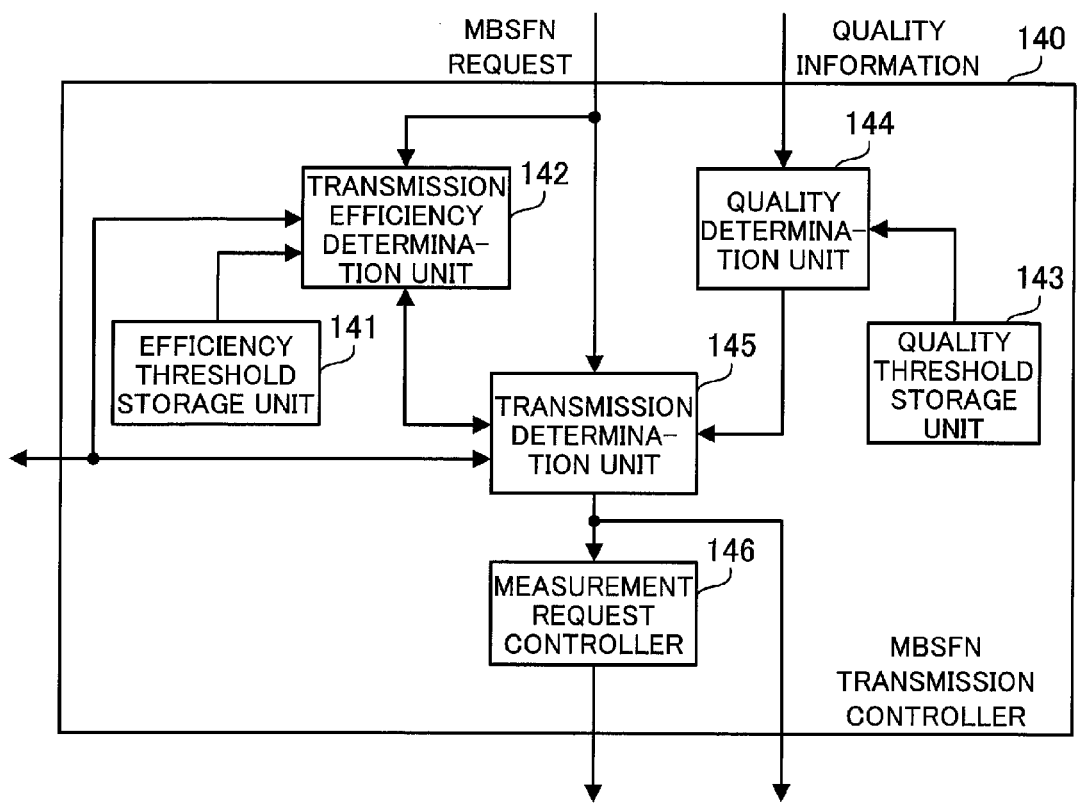
FIG. 19 is a block diagram illustrating an MBSFN transmission controller according to a third embodiment.

FIG. 19 is a block diagram illustrating the MBSFN transmission controller according to the third embodiment. The MBSFN transmission controller 140 has an efficiency threshold storage unit 141, a transmission efficiency determination unit 142, a quality threshold storage unit 143, a quality determination unit 144, a transmission determination unit 145, and a measurement request controller 146.

The efficiency threshold storage unit 141 stores a threshold of transmission efficiency used to determine whether the base station 100 preferably stops the MBSFN transmission. The transmission efficiency is an index illustrating utilization efficiency of radio resources about the MBSFN transmission. For example, the transmission efficiency is defined as a rate (namely, a usage rate of radio resources in the MBSFN subframe) of the total amount of the MBMS data transmitted by the base station 100 to the amount of radio resources in the MBSFN subframe.

When an MBSFN request is obtained from the MBSFN request extraction unit 117, the transmission efficiency determination unit 142 calculates transmission efficiency in the case where the base station 100 transmits the requested MBMS data. The transmission efficiency determination unit 142 then compares the calculated transmission efficiency with a threshold stored in the efficiency threshold storage unit 141 and notifies the transmission determination unit 145 whether the transmission efficiency is greater than or equal to the threshold. When detecting that mobile stations which receive the MBMS data are reduced among the mobile stations connected to the base station 100, the transmission efficiency determination unit 142 further recalculates the transmission efficiency and notifies the transmission determination unit 145 whether the transmission efficiency is greater than or equal to the threshold. Note that information on the data amount of each MBMS data is received from the MCE 410.

When the MBSFN request is obtained from the MBSFN request extraction unit 117, the transmission determination unit 145 transfers the MBSFN request to the MCE 410. When notified by the transmission efficiency determination unit 142 that the transmission efficiency is smaller than the threshold, the transmission determination unit 145 notifies the measurement request controller 146 that the measurement request is transmitted. When notified by the quality determination unit 144 that the reception quality is higher than or equal to the threshold, the transmission determination unit 145 then requests the MCE 410 to stop transmitting the MBMS data and notifies the MBSFN control signal generation unit 131 of the instruction to cause the mobile station 300 to receive the MBMS data from other base stations.

Through the reduction in the number of the mobile stations which receive the MBMS data, when notified by the transmission efficiency determination unit 142 that the transmission efficiency is smaller than the threshold, the transmission determination unit 145 controls the base station 100 not to transmit the MBMS data in the same manner as in the case of obtaining the MBSFN request.

Operations of the quality threshold storage unit 143, quality determination unit 144, and measurement request controller 146 are the same as those of the quality threshold storage unit 122, quality determination unit 123, and measurement request controller 125 of the MBSFN transmission controller 120.

Figure 20:
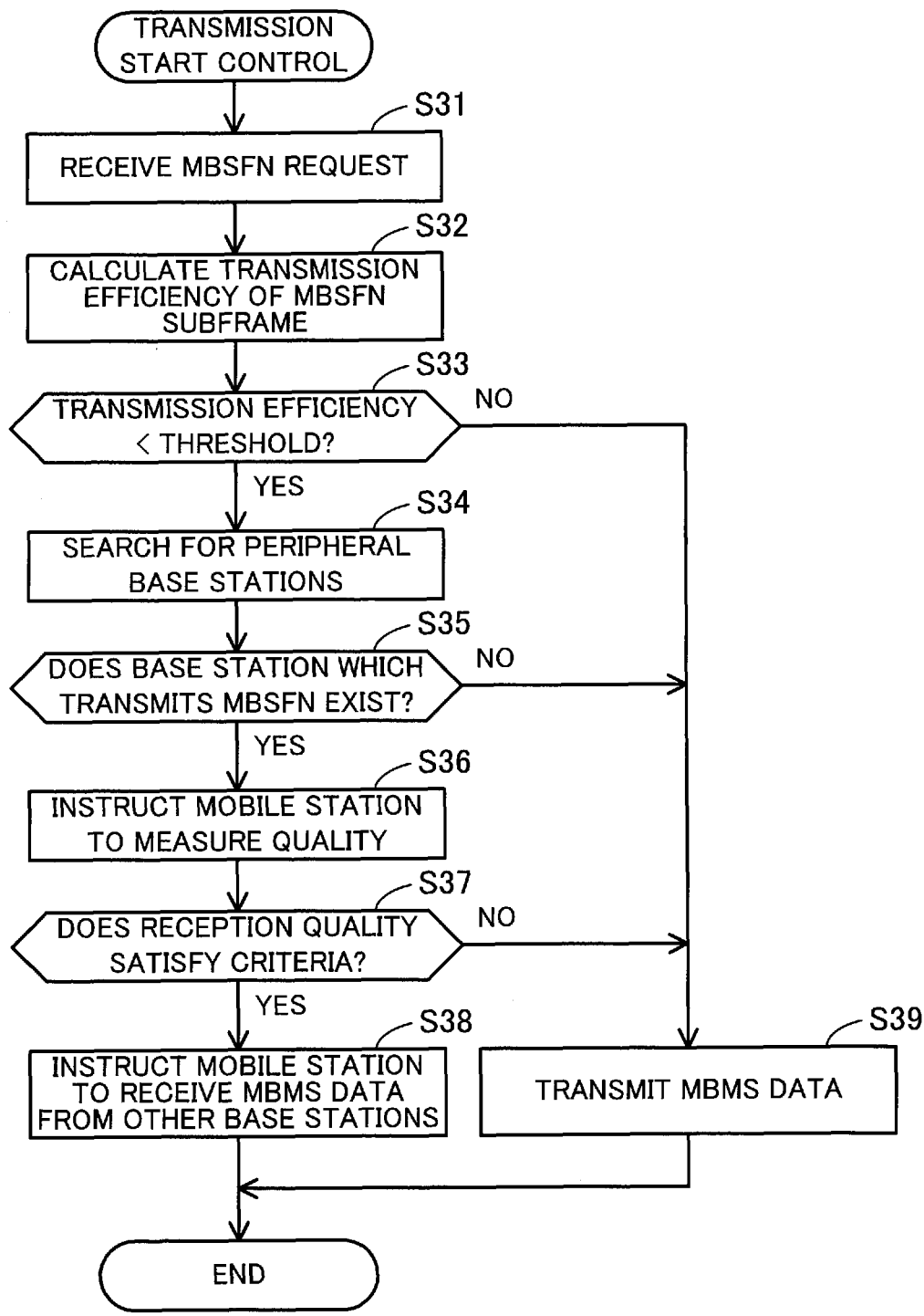
FIG. 20 is a flowchart illustrating transmission start control according to a third embodiment.

FIG. 20 is a flowchart illustrating the transmission start control according to the third embodiment. The control process illustrated in FIG. 20 includes the following steps:

(Step S31) The base station 100 receives the MBSFN request from the mobile station 300.

(Step S32) The transmission efficiency determination unit 142 calculates transmission efficiency of the MBSFN subframe in the case where the base station 100 transmits the requested MBMS data.

(Step S33) The transmission efficiency determination unit 142 determines whether the transmission efficiency calculated at step S32 is smaller than a predetermined threshold. If so, the process advances to step S34. If not, the process proceeds to step S39.

(Step S34) The measurement request controller 146 searches for a base station which currently performs the MBSFN transmission among the peripheral base stations.

(Step S35) The measurement request controller 146 determines whether a base station which performs the MBSFN transmission exists. If so, the process advances to step S36. If not, the process proceeds to step S39.

(Step S36) The base station 100 transmits to the mobile station 300 a measurement request including information illustrating a base station which performs the MBSFN transmission. The base station 100 then receives quality information on the base station notified of, from the mobile station 300.

(Step S37) The quality determination unit 144 determines whether reception quality indicated by the quality information received from the mobile station 300 satisfies criteria. If so, the process advances to step S38. If not, the process proceeds to step S39.

(Step S38) The base station 100 notifies the mobile station 300 that the MBMS data is received from other base stations which perform the MBSFN transmission.

(Step S39) The base station 100 transmits the MBMS data requested from the mobile station 300. The mobile station 300 receives the MBMS data also from the base station 100.

Through the above steps, even in the case where the MBSFN request is received from the mobile station 300, when transmission efficiency of the MBSFN subframe is smaller than the threshold and reception quality of the mobile station 300 is higher than or equal to the threshold, the base station 100 does not transmit the requested MBMS data.

Figure 21:
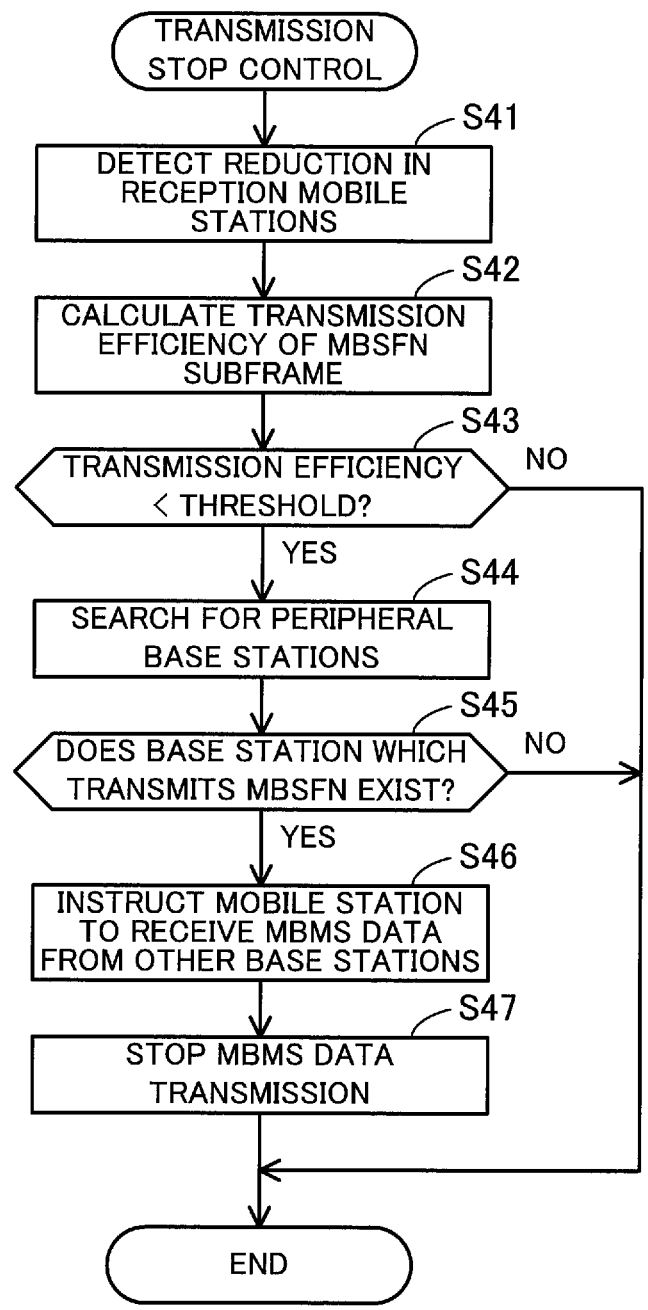
FIG. 21 is a first flowchart illustrating transmission stop control according to a third embodiment.

FIG. 21 is a first flowchart illustrating the transmission stop control according to the third embodiment. As a first method, the following section will now discuss the case where the reception quality of the mobile station 300 is not set to be higher than or equal to the threshold as a condition. The control process illustrated in FIG. 21 includes the following steps:

(Step S41) Among the mobile stations connected to the base station 100, the transmission efficiency determination unit 142 detects that mobile stations which receive the MBMS data from the base station 100 are reduced.

(Step S42) The transmission efficiency determination unit 142 calculates transmission efficiency of the MBSFN subframe in the reduced number of the mobile stations.

(Step S43) The transmission efficiency determination unit 142 determines whether the transmission efficiency calculated at step S42 is smaller than the predetermined threshold. If so, the process proceeds to step S44. If not, the process ends.

(Step S44) From among peripheral base stations, the measurement request controller 146 searches for a base station which currently performs the MBSFN transmission.

(Step S45) The measurement request controller 146 determines whether the base station which performs the MBSFN transmission exists. If so, the process proceeds to step S46. If not, the process ends.

(Step S46) The base station 100 notifies the mobile station 300 that the MBMS data is received from other base stations which perform the MBSFN transmission.

(Step S47) The base station 100 stops transmitting the MBMS data received from its own station by the mobile station 300.

Figure 22:
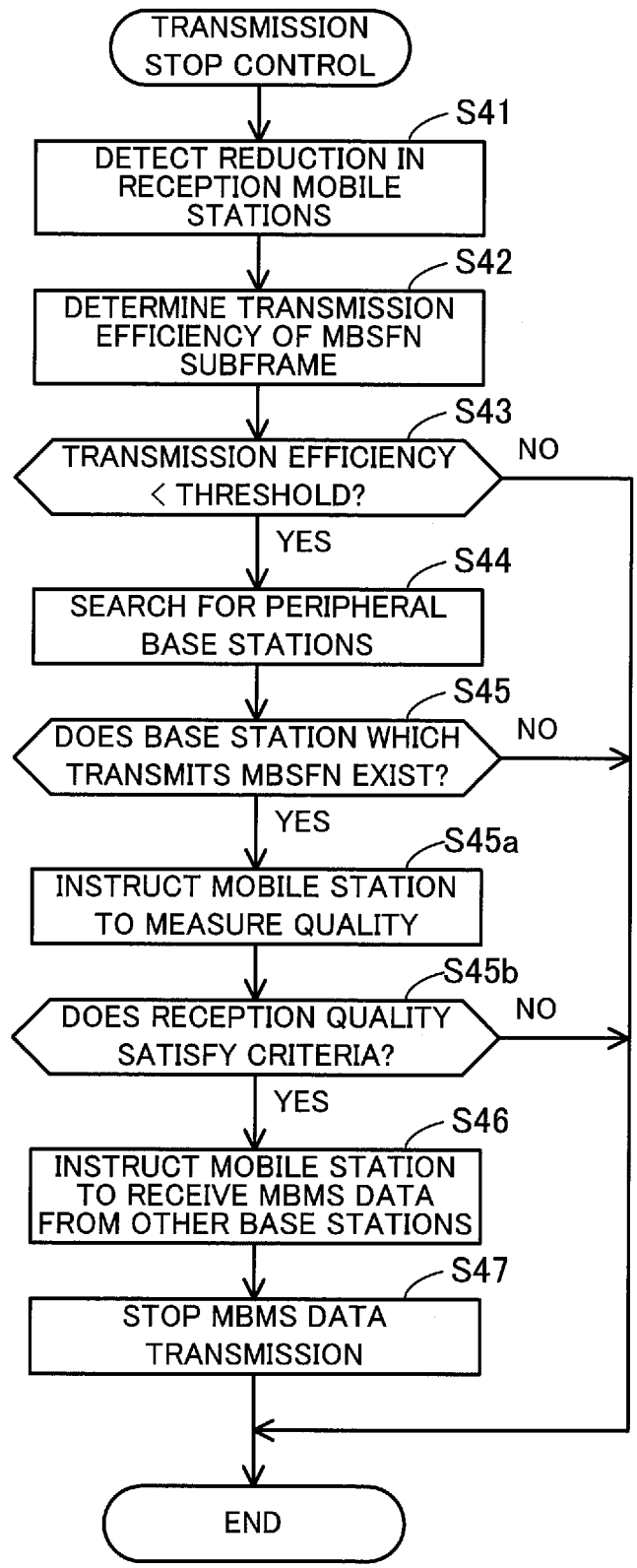
FIG. 22 is a second flowchart illustrating transmission stop control according to a third embodiment.

FIG. 22 is a second flowchart illustrating the transmission stop control according to the third embodiment. As a second method, the following section will now discuss the case where the reception quality of the mobile station 300 is set to be higher than or equal to the threshold as a condition. In the control process illustrated in FIG. 22, steps S45a and S45b described below are performed between steps S45 and S46 of the control process illustrated in FIG. 21.

(Step S45a) The base station 100 transmits to the mobile station 300 a measurement request including information indicating the base station which performs the MBSFN transmission. The base station 100 then receives the quality information on the base station notified of, from the mobile station 300.

(Step S45b) The quality determination unit 144 determines whether reception quality indicated by the quality information received from the mobile station 300 satisfies criteria. If so, the process proceeds to step S46. If not, the process ends.

Through the above steps, when the transmission efficiency of the MBSFN subframe is smaller than the threshold, the base station 100 stops receiving the MBMS data. Or, alternatively, in the case where the transmission efficiency of the MBSFN subframe is smaller than the threshold and the reception quality of the mobile station which receives the MBMS data is higher than or equal to the threshold, the base station 100 stops transmitting the MBMS data.

In the above-described mobile communication system according to the second embodiment, the base station 100 is configured to stop the MBSFN transmission when transmission efficiency of the MBSFN subframe is low and subordinate mobile stations are capable of receiving the MBMS data from other base stations. Accordingly, the base station 100 provides an MBSFN area in which base stations which perform the MBSFN transmission and base stations which do not perform the MBSFN transmission mixedly exist, and improves utilization efficiency of radio resources. Further, the base station 100 smoothly controls the mobile station 300 to receive the MBMS data from a base station which performs the MBSFN transmission.

In addition, one determination method based on the number of the mobile stations which receive the MBMS data according to the second embodiment and another determination method based on the transmission efficiency according to the third embodiment may be used in combination thereof. For example, when the number of the mobile stations is smaller than the threshold and the transmission efficiency is smaller than the threshold, the base station 100 may instruct the mobile station 300 to receive the MBMS data from other base stations.

(Fourth Embodiment)

A fourth embodiment will be described below. Since the fourth embodiment shares some elements with the foregoing second embodiment, the following discussion will focus on their distinctive points, omitting explanations of similar elements. In a mobile communication system according to the fourth embodiment, an MCE determines whether a base station performs the MBSFN transmission.

The mobile communication system according to the fourth embodiment is deployed by using the same system configuration as that of the second embodiment illustrated in FIG. 2. Further, a base station and mobile station according to the fourth embodiment are deployed by using the same block configurations as those of the second embodiment illustrated in FIGS. 5 and 7. Note that an MBSFN transmission controller 150 described below is used in place of the MBSFN transmission controller 120. An MCE 420 described below is further used in place of the MCE 410.

Figure 23:
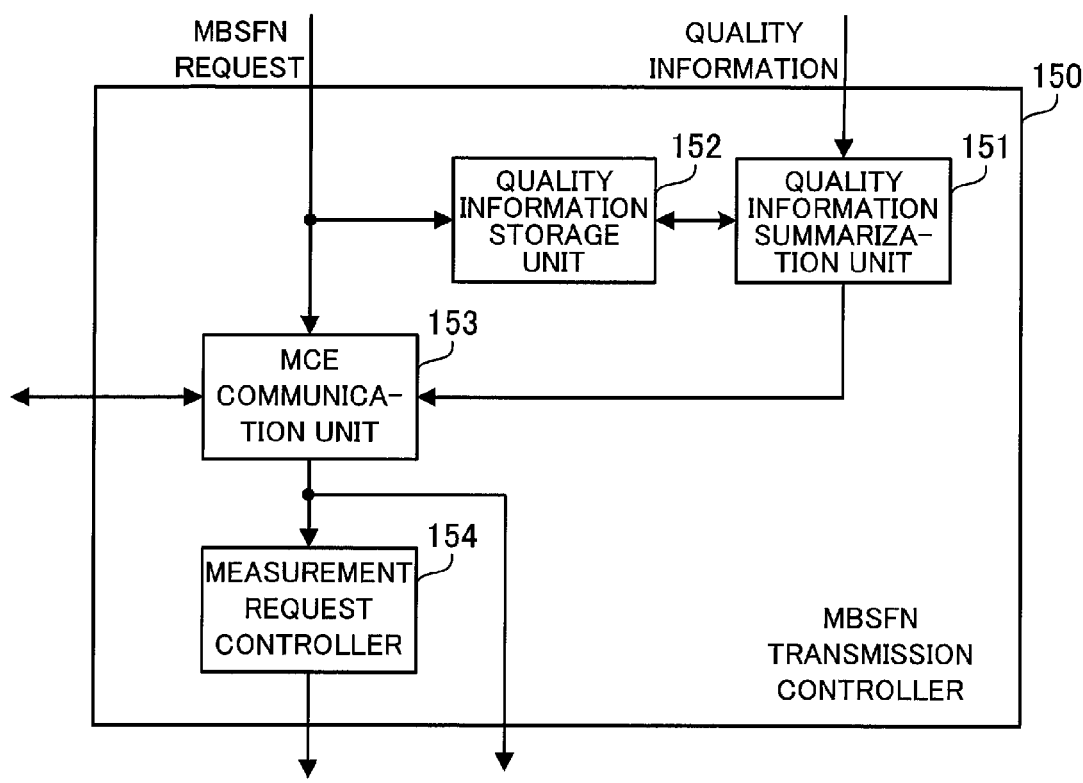
FIG. 23 is a block diagram illustrating an MBSFN transmission controller according to a fourth embodiment.

FIG. 23 is a block diagram illustrating an MBSFN transmission controller according to the fourth embodiment. The MBSFN transmission controller 150 has a quality information summarization unit 151, a quality information storage unit 152, an MCE communication unit 153, and a measurement request controller 154.

When quality information about the MBSFN transmission is produced from the quality information extraction unit 114, the quality information summarization unit 151 stores the produced quality information in the quality information storage unit 152. The quality information summarization unit 151 then summarizes the quality information stored in the quality information storage unit 152 and supplies it to the MCE communication unit 153. At this time, in the case where the quality information is information indicating reception quality of each base station which performs the MBSFN transmission, the quality information summarization unit 151 may carry out statistical treatment of the indicated reception qualities and calculate reception quality of the entire two or more base stations, thereby supplying it as the summarized quality information.

The quality information storage unit 152 receives the MBSFN request from the MBSFN request extraction unit 117 and the quality information from the quality information summarization unit 151. The quality information storage unit 152 then stores the quality information correspondingly to the mobile station which transmits the MBSFN request.

The MCE communication unit 153 transmits and receives various control parameters between the base station 100 and the MCE 420. Specifically, the MCE communication unit 153 transfers the MBSFN request produced from the MBSFN request extraction unit 117 to the MCE 420. When the measurement request is received from the MCE 420, the MCE communication unit 153 supplies it to the measurement request controller 154. The MCE communication unit 153 further transfers to the MCE 420 the quality information produced from the quality information summarization unit 151. When control parameters about the instruction to cause the mobile station 300 to receive the MBMS data from base stations except the base station 100 are received from the MCE 420, the MCE communication unit 153 notifies the MBSFN control signal generation unit 131 of the instruction.

When the measurement request is produced from the MCE communication unit 153, the measurement request controller 154 notifies the measurement request generation unit 132 of the base station which performs the MBSFN transmission.

Figure 24:
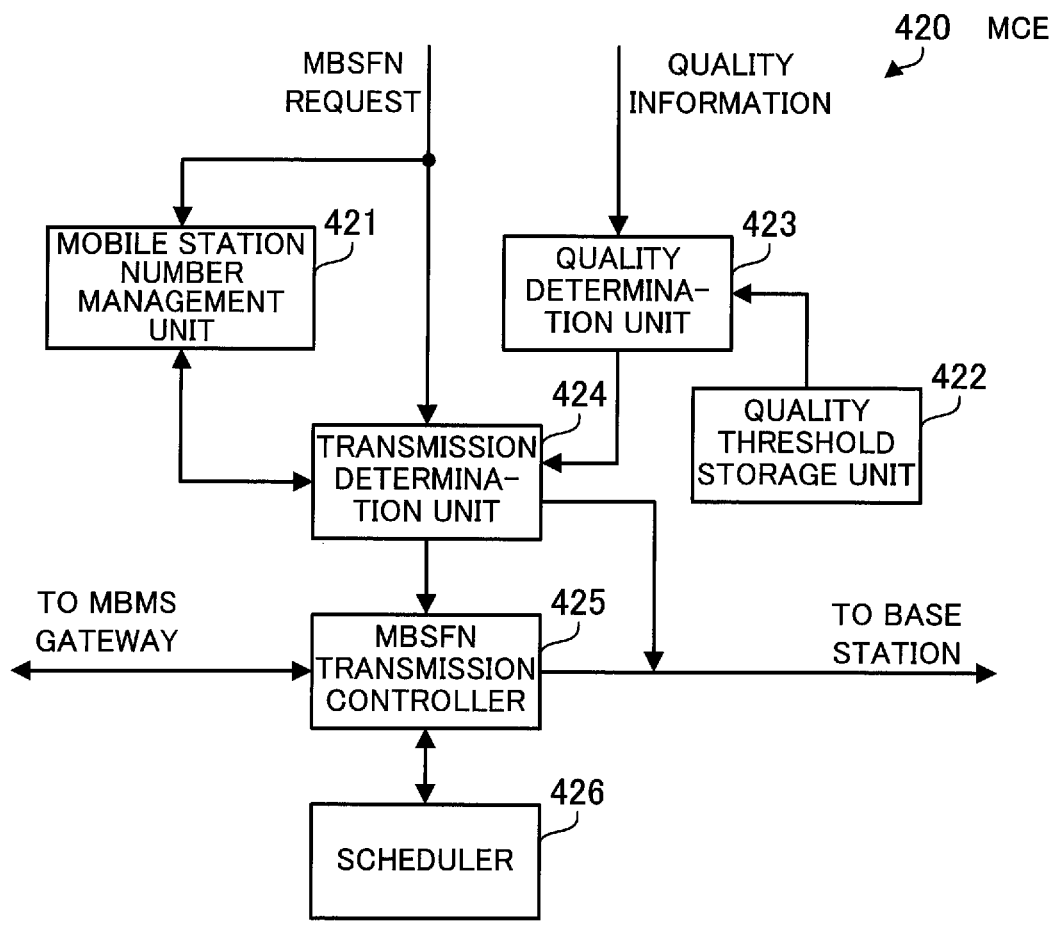
FIG. 24 is a block diagram illustrating an MCE according to a fourth embodiment.

FIG. 24 is a block diagram illustrating an MCE according to the fourth embodiment. The MCE 420 includes the following elements: a mobile station number management unit 421, a quality threshold storage unit 422, a quality determination unit 423, a transmission determination unit 424, an MBSFN transmission controller 425, and a scheduler 426.

With respect to each of the plurality of base stations, the mobile station number management unit 421 manages the number of the mobile stations which receive the MBMS data from the base station among the mobile stations connected to the base station.

The quality threshold storage unit 422 stores a threshold of the reception quality used to determine whether the mobile station 300 receives the MBMS data from other base stations.

When quality information about the MBSFN transmission is received from the base station 100, the quality determination unit 423 compares reception quality indicated by the quality information with a threshold stored in the quality threshold storage unit 422. The quality determination unit 423 then notifies the transmission determination unit 424 whether the reception quality is higher than or equal to the threshold.

When the MBSFN request is received from the base station 100, the transmission determination unit 424 compares the number of the mobile stations managed by the mobile station number management unit 421 with the predetermined threshold. In the case where the number of the mobile stations is smaller than the threshold, the transmission determination unit 424 transmits a measurement request to the base station 100. When notified by the quality determination unit 423 that the reception quality is higher than or equal to the threshold, the transmission determination unit 424 notifies the MBSFN transmission controller 425 that transmission of the MBMS data is stopped.

When detecting that the number of the mobile stations which receive the MBMS data is reduced, the transmission determination unit 424 compares the number of the mobile stations managed by the mobile station number management unit 421 with the predetermined threshold. In the case where the number of the mobile stations is smaller than the threshold, in the same manner as in the case of obtaining the MBSFN request, the transmission determination unit 424 notifies the MBSFN transmission controller 425 that transmission of the MBMS data is stopped. At this time, in addition to the fact that the number of the mobile stations is smaller than the threshold, the reception quality may be set to be higher than or equal to the threshold as a condition.

According to the notification from the transmission determination unit 424, the MBSFN transmission controller 425 transmits the MBSFN control parameters to the base station which performs the MBSFN transmission and the MBMS gateway 520. To the base station 100, for example, the MBSFN transmission controller 425 transmits control parameters indicating the instruction for causing the mobile station 300 to receive the MBMS data from base stations except the base station 100. To the base station which performs the MBSFN transmission, the MBSFN transmission controller 425 further transmits information indicating the radio resources or modulation and coding scheme used to transmit the MBMS data. To the MBMS gateway 520, the MBSFN transmission controller 425 further transmits information indicating the base station which transmits the MBMS data.

The scheduler 426 schedules the MBSFN transmission. Specifically, the scheduler 426 selects radio resources or modulation and coding scheme used to transmit the MBMS data. The scheduler 426 further selects timing of the MBSFN transmission or slot used to perform the MBSFN transmission.

Figure 25:
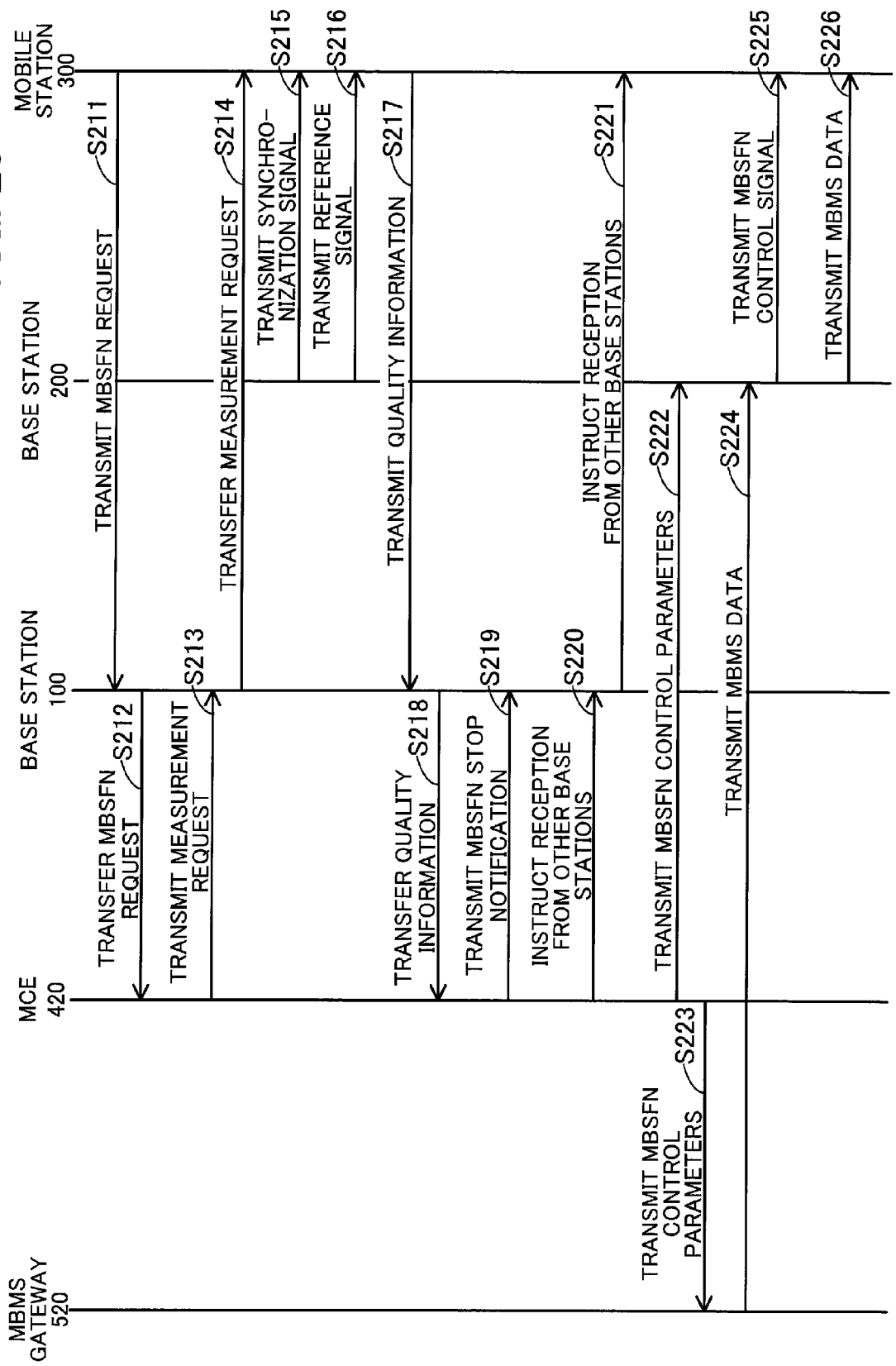
FIG. 25 is a sequence diagram illustrating a flow of a transmission start according to a fourth embodiment.

FIG. 25 is a sequence diagram illustrating a flow of the transmission start according to the fourth embodiment. The sequence illustrated in FIG. 25 includes the following steps:

(Step S211) The mobile station 300 transmits the MBSFN request to the base station 100.

(Step S212) The base station 100 transfers the MBSFN request to the MCE 420.

(Step S213) The MCE 420 confirms that performance conditions in the MBSFN transmission of the base station 100 satisfy a predetermined condition, and transmits a measurement request to the base station 100.

(Step S214) The base station 100 transfers the measurement request to the mobile station 300.

(Step S215) The base station 200 transmits a synchronization signal through a DL radio frame. The mobile station 300 synchronizes with the base station 200 by using the received synchronization signal.

(Step S216) The base station 200 transmits a reference signal through the DL radio frame. The mobile station 300 measures reception quality about the MBSFN transmission by using the received reference signal.

(Step S217) To the base station 100, the mobile station 300 transmits quality information indicating the reception quality about the MBSFN transmission measured at step S216.

(Step S218) The base station 100 transfers the quality information to the MCE 420.

(Step S219) The MCE 420 confirms that the reception quality indicated by the quality information satisfies a predetermined condition. The MCE 420 further transmits to the base station 100 an MBSFN stop notification indicating that the base station 100 does not transmit the MBMS data requested by the mobile station 300.

(Step S220) The MCE 420 transmits to the base station 100 the instruction for causing the mobile station 300 to receive the MBMS data from base stations except the base station 100.

(Step S221) The base station 100 transfers the instruction received from the MCE 420 to the mobile station 300.

(Step S222) The MCE 420 transmits the control parameters about the MBMS data requested by the mobile station 300 to the base stations which include the base station 200 and perform the MBSFN transmission.

(Step S223) The MCE 420 transmits the control parameters about the MBMS data requested by the mobile station 300 to the MBMS gateway 520.

(Step S224) The MBMS gateway 520 transmits the MBMS data to the base stations which include the base station 200 and perform the MBSFN transmission.

(Step S225) The base station 200 generates an MBSFN control signal based on the MBSFN control parameters received at step S222, and transmits it through the MBSFN subframe.

(Step S226) The base station 200 transmits the MBMS data received at step S224 through the MBSFN subframe.

Figure 26:
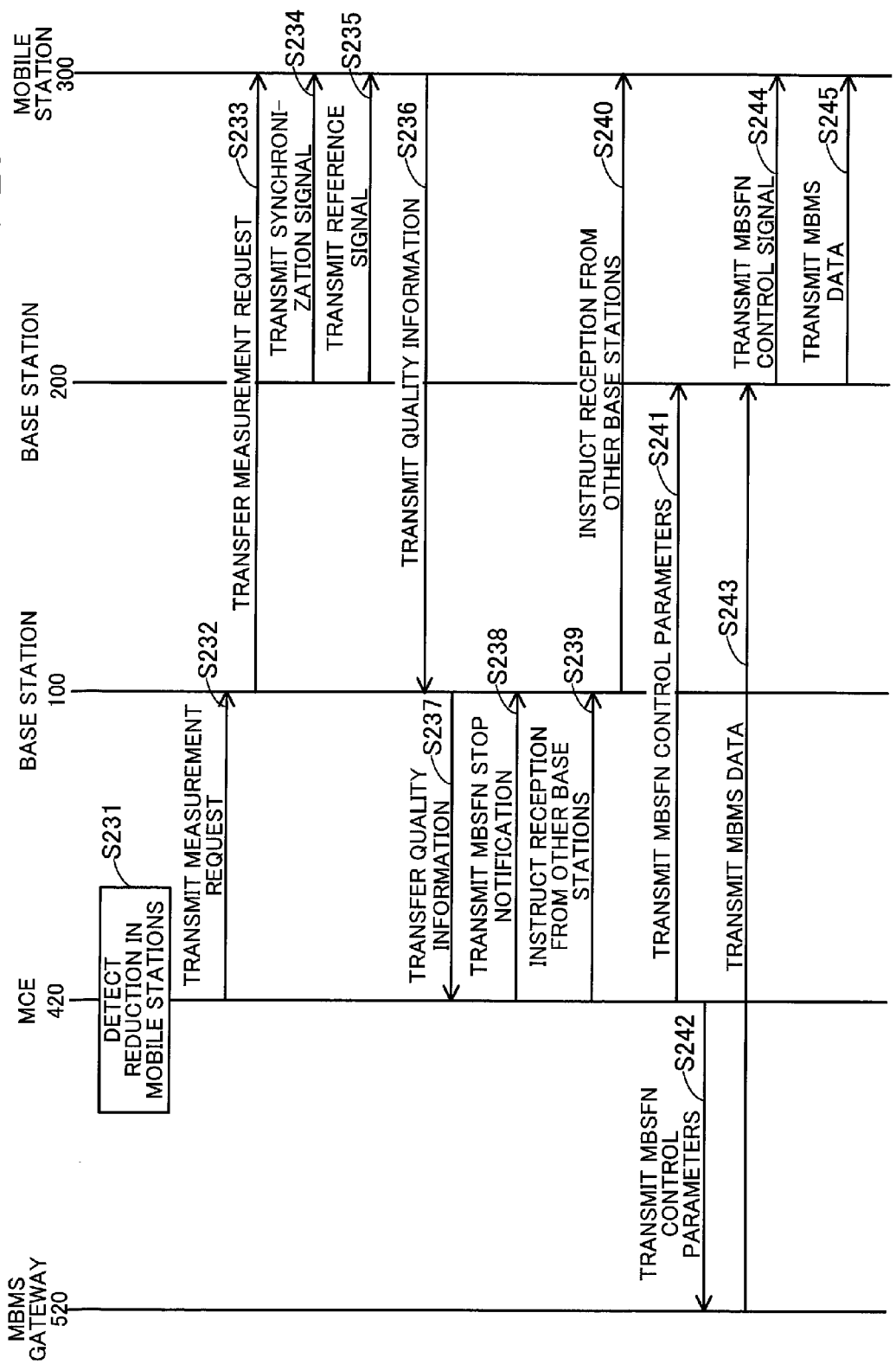
FIG. 26 is a sequence diagram illustrating a flow of a transmission stop according to a fourth embodiment.

FIG. 26 is a sequence diagram illustrating a flow of the transmission stop according to the fourth embodiment. The sequence illustrated in FIG. 26 includes the following steps:

(Step S231) Among the mobile stations connected to the base station 100, the MCE 420 detects that the number of the mobile stations which receive the MBMS data from the base station 100 is reduced.

(Step S232) The MCE 420 confirms that performance conditions in the MBSFN transmission of the base station 100 satisfy a predetermined condition, and transmits a measurement request to the base station 100.

(Step S233) The base station 100 transfers the measurement request to the mobile station 300.

Hereinafter, the same processes as those of steps S215 to S226 of FIG. 25 are performed as steps S234 to S245.

The fourth embodiment provides a mobile communication system in which the base station 100 obtains the same effect as that of the second embodiment. In the fourth embodiment, since the MCE 420 determines in a unified manner whether a plurality of base stations each perform MBSFN transmission, the mobile communication system efficiently performs determination.

(Fifth Embodiment)

A fifth embodiment will be described below. Since the fifth embodiment shares some elements with the foregoing fourth embodiment, the following discussion will focus on their distinctive points, omitting explanations of similar elements. In a mobile communication system of the fifth embodiment, the base station 100 determines based on transmission efficiency whether to perform MBSFN transmission in the same manner as in the third embodiment. The mobile communication system of the fifth embodiment is deployed by using the same base station and mobile station as those of the fourth embodiment. In the fifth embodiment, an MCE 430 described below is used in place of the MCE 420.

Figure 27:
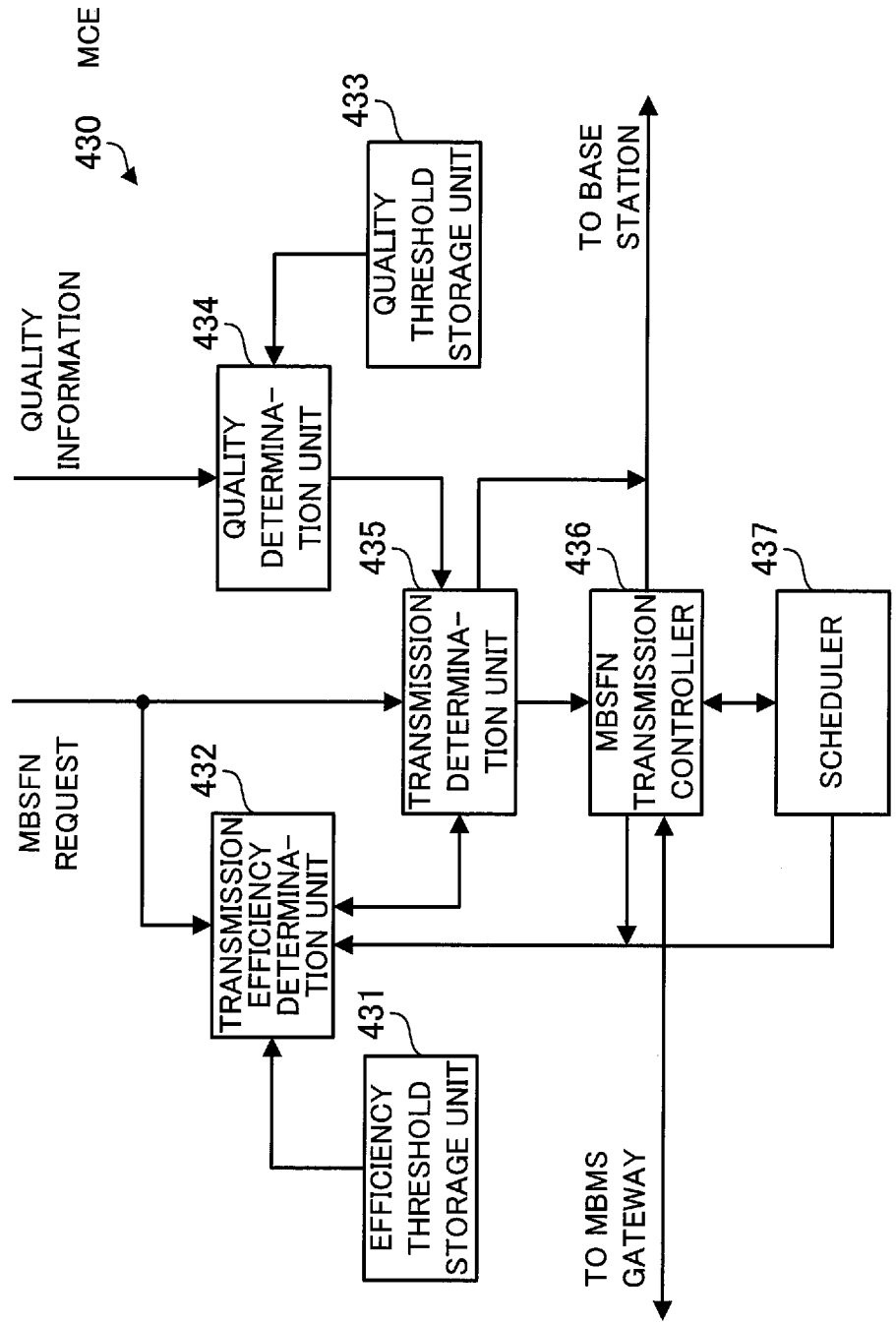
FIG. 27 is a block diagram illustrating an MCE according to a fifth embodiment.

FIG. 27 is a block diagram illustrating an MCE according to the fifth embodiment. The MCE 430 includes the following elements: an efficiency threshold storage unit 431, a transmission efficiency determination unit 432, a quality threshold storage unit 433, a quality determination unit 434, a transmission determination unit 435, an MBSFN transmission controller 436, and a scheduler 437.

The efficiency threshold storage unit 431 stores thresholds of transmission efficiency.

When an MBSFN request is received from the base station 100, the transmission efficiency determination unit 432 calculates transmission efficiency in the case where the base station 100 transmits the requested MBMS data. The transmission efficiency determination unit 432 then notifies the transmission determination unit 435 whether the calculated transmission efficiency is greater than or equal to the threshold stored in the efficiency threshold storage unit 431. When detecting that mobile stations which receive the MBMS data are reduced among the mobile stations connected to the base station 100, the transmission efficiency determination unit 432 recalculates transmission efficiency and notifies the transmission determination unit 435 whether the transmission efficiency is greater than or equal to the threshold. In addition, the total amount of the MBMS data transmitted by the base station 100 is specified based on the information produced from the MBSFN transmission controller 436 and the scheduler 437.

Upon receipt of the MBSFN request from the base station 100, when notified by the transmission efficiency determination unit 432 that the transmission efficiency is smaller than the threshold, the transmission determination unit 435 transmits a measurement request to the base station 100. Afterward, when notified by the quality determination unit 434 that the reception quality is higher than or equal to the threshold, the transmission determination unit 435 notifies the MBSFN transmission controller 436 that transmission of the MBMS data is stopped.

Based on the reduction in the number of the mobile stations which receive the MBMS data, the transmission determination unit 435 is notified by the transmission efficiency determination unit 432 that the transmission efficiency of the base station 100 is smaller than the threshold. At this time, in the same manner as in the case of obtaining the MBSFN request, the transmission determination unit 435 notifies the MBSFN transmission controller 436 that transmission of the MBMS data is stopped. At this time, in addition to the condition that the transmission efficiency is smaller than the threshold, the reception quality of the mobile station 300 may be set to be higher than or equal to the threshold as a condition.

Operations of the quality threshold storage unit 433, quality determination unit 434, MBSFN transmission controller 436, and scheduler 437 are the same as those of the quality threshold storage unit 422, quality determination unit 423, MBSFN transmission controller 425, and scheduler 426 of the MCE 420.

The fifth embodiment provides a mobile communication system in which the base station 100 obtains the same effect as that of the third embodiment. Since the MCE 430 determines in a unified manner whether a plurality of base stations each perform MBSFN transmission, these features of the fifth embodiment permit the base station 100 to efficiently perform determination.

(Sixth Embodiment)

A sixth embodiment will be described below. Since the sixth embodiment shares some elements with the foregoing second embodiment, the following discussion will focus on their distinctive points, omitting explanations of similar elements. In a mobile communication system according to the sixth embodiment, a mobile station determines whether reception quality about MBSFN transmission is higher than a predetermined threshold. In the mobile communication system of the sixth embodiment, a mobile station 300a described below is used in place of the foregoing mobile station 300.

Figure 28:
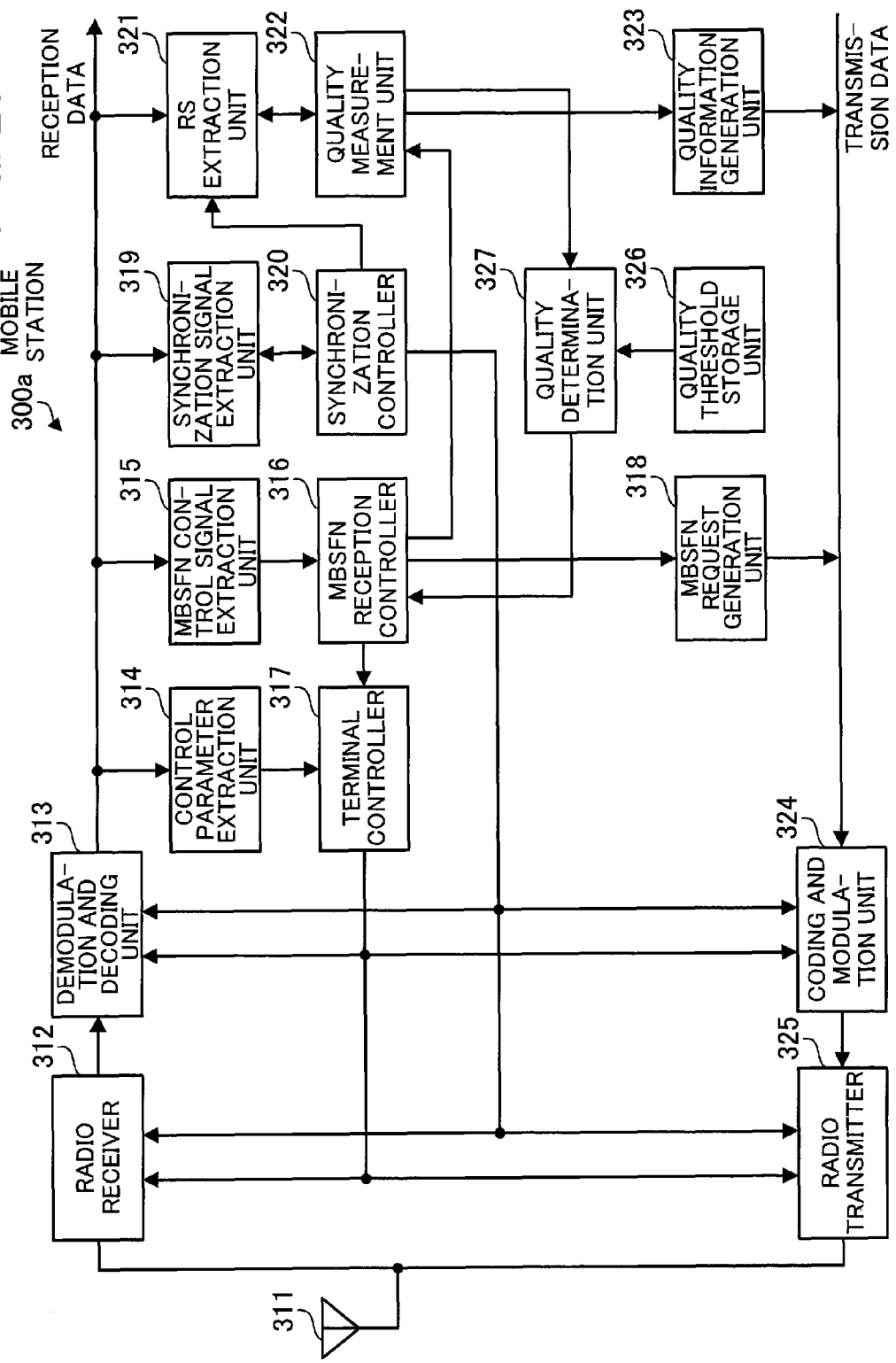
FIG. 28 is a block diagram illustrating a mobile station according to a sixth embodiment.

FIG. 28 is a block diagram illustrating the mobile station according to the sixth embodiment. In addition to block elements of the mobile station 300 illustrated in FIG. 7, the mobile station 300a has a quality threshold storage unit 326 and a quality determination unit 327.

The quality threshold storage unit 326 stores thresholds of the reception quality used to determine whether the mobile station 300a receives the MBMS data from base stations except the base station 100.

The quality determination unit 327 obtains measurement results of the reception quality from the quality measurement unit 322, and compares the measured reception quality with the threshold stored in the quality threshold storage unit 326. At this time, in the case where the obtained measurement result is information indicating reception quality of each base station which performs the MBSFN transmission, the quality determination unit 327 carries out statistical treatment of the indicated reception qualities and calculates reception quality of the entire two or more base stations, thereby comparing it with the threshold. As quality information about the MBSFN transmission, the quality determination unit 327 then generates information indicating whether the reception quality is higher than or equal to the threshold.

The quality information indicating whether the reception quality is higher than or equal to the threshold is transmitted to the base station 100 via the MBSFN reception controller 316. Based on the quality information as a determination result, the base station 100 determines whether MBSFN transmission is stopped.

The sixth embodiment provides a mobile communication system in which the mobile station 300 obtains the same effect as that of the second embodiment. Since the mobile station 300 determines whether reception quality satisfies criteria and notifies the base station 100 of determination results, these features of the sixth embodiment permit the mobile station 300 to reduce the load on the base station 100 and suppress the information amount of control parameters.

(Seventh Embodiment)

A seventh embodiment will be described below. Since the seventh embodiment shares some elements with the foregoing second embodiment, the following discussion will focus on their distinctive points, omitting explanations of similar elements. In a mobile communication system according to the seventh embodiment, functions of MCE are mounted on a base station, and the MCE is not provided as an independent device.

Figure 29:
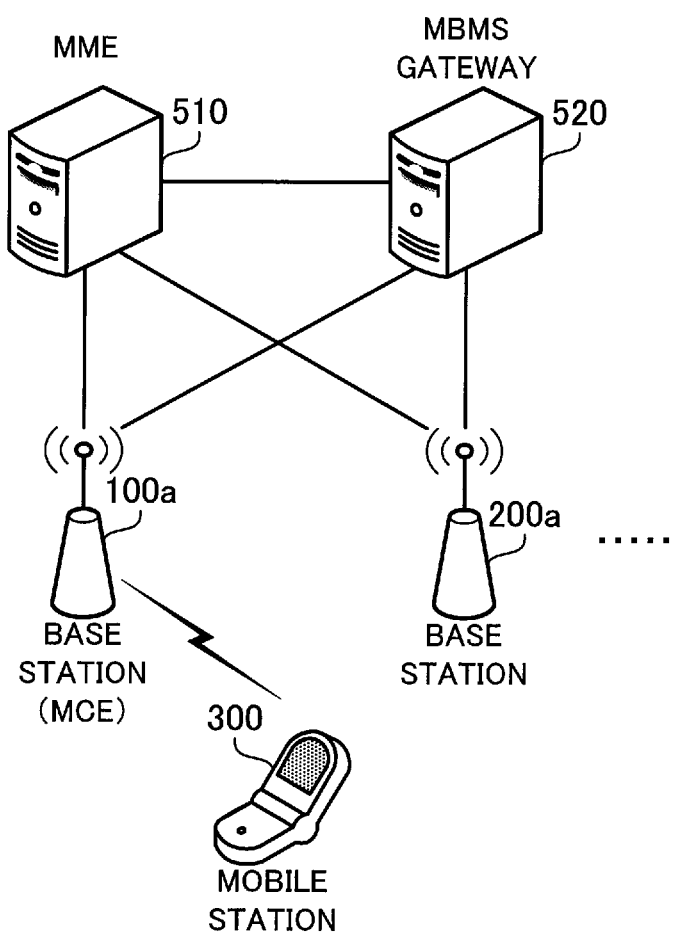
FIG. 29 illustrates a mobile communication system according to a seventh embodiment.

FIG. 29 illustrates the mobile communication system according to the seventh embodiment. The mobile communication system according to the seventh embodiment has a plurality of base stations including base stations 100a and 200a, the mobile station 300, MME 510, and MBMS gateway 520.

At least one base station (e.g., base station 100a) of a plurality of base stations existing in an MBSFN area has a function of the MCE, namely, a function of controlling MBSFN transmission. A base station having no MCE function transmits and receives control parameters between its own station and a base station having an MCE function via a wired network, thereby performing the MBSFN transmission.

The seventh embodiment provides a mobile communication system in which the base station 100a obtains the same effect as that of the second embodiment. Since the MCE may not have to be provided as a separate device, a system configuration may be simplified.

According to the above-described mobile communication system, base station, mobile station, and radio communication method, a base station smoothly controls reception processing of the mobile station which receives data of the same content transmitted at the same timing by a plurality of base stations.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. A mobile communication system comprising:
   a plurality of base stations; and
   a plurality of mobile stations,
   wherein:
   among the plurality of base stations, two or more base stations broadcast data of the same content at the same timing by using the same frequency and modulation scheme;
   a base station among the plurality of base stations includes
      a notification unit which notifies the plurality of mobile stations of two or more other base stations broadcasting the data of the same content among the plurality of base stations, and
      a controller which instructs the plurality of mobile stations to receive the data of the same content from the two or more other base stations; and
   a mobile station among the plurality of mobile stations includes
      a transmitter which transmits information indicating reception conditions of radio signals from the two or more other base stations notified of from the base station, and
      a receiver which receives the data of the same content from the two or more other base stations according to an instruction from the base station.

2. The mobile communication system according to claim 1, wherein
   when instructing the plurality of mobile stations to receive the data of the same content from the two or more other base stations, the controller controls the base station not to broadcast the data of the same content.

3. The mobile communication system according to claim 1, wherein
the receiver receives the data of the same content from the two or more other base stations and other data from the base station.

4. The mobile communication system according to claim 1, wherein
the receiver receives a control signal used to receive the data of the same content from the two or more other base stations from the base stations.

5. The mobile communication system according to claim 1, wherein
the notification unit notifies the plurality of mobile stations of the two or more other base stations according to transmission conditions of data of the same content transmitted by the base stations.

6. The mobile communication system according to claim 5, wherein:
for transmission conditions of data of the same content, a number of mobile stations which receive data of the same content from the base station is used; and
when the number of the mobile stations is smaller than a predetermined threshold, the notification unit notifies the plurality of mobile stations of the two or more other base stations.

7. The mobile communication system according to claim 5, wherein:
for transmission conditions of data of the same content, transmission efficiency calculated based on a data amount of the same content broadcasted by the base station and an amount of radio resources capable of being used to broadcast the data of the same content is used; and
when the transmission efficiency is smaller than a predetermined threshold, the notification unit notifies the plurality of mobile stations of the two or more other base stations.

8. The mobile communication system according to claim 1, wherein
the notification unit receives a request of data of the same content from the mobile station and notifies the mobile station of the two or more other base stations.

9. The mobile communication system according to claim 1, wherein
the notification unit notifies the plurality of mobile stations of the two or more other base stations in response to a reduction in mobile stations which receive data of the same content from the base station.

10. The mobile communication system according to claim 1, wherein
when reception quality indicated by information indicating the reception conditions satisfies a predetermined condition, the controller instructs the plurality of mobile stations to receive data of the same content from the two or more other base stations.

11. The mobile communication system according to claim 1, wherein:
the two or more other base stations each broadcast data of the same content and each transmit other data in time division; and
the mobile station among the plurality of mobile stations further includes a measurement unit which measures, for the reception conditions, reception quality of radio signals in duration in which the other data is transmitted regarding each of the two or more other base stations.

12. The mobile communication system according to claim 1, wherein:
the two or more other base stations each broadcast data of the same content and each transmit other data in time division; and
the mobile station among the plurality of mobile stations further includes a measurement unit which measures, for the reception conditions, reception quality of signals in which radio signals from the two or more other base stations are combined in duration in which data of the same content is broadcasted.

13. A base station for use in a mobile communication system to include a plurality of base stations and in which two or more base stations broadcast data of the same content at the same timing by using the same frequency and modulation scheme among the plurality of base stations, the base station comprising:
a notification unit configured to notify a plurality of mobile stations of two or more other base stations which broadcast the data of the same content among the plurality of base stations; and
a controller configured to instruct the plurality of mobile stations to receive the data of the same content from the two or more other base stations.

14. A mobile station among a plurality of mobile stations for use in a mobile communication system which includes a plurality of base stations and in which two or more base stations broadcast data of the same content at the same timing by using the same frequency and modulation scheme among the plurality of base stations, the mobile station comprising:
a transmitter configured to receive notifications of two or more second base stations which broadcast the data of the same content among the plurality of base stations from a first base station among the plurality of base stations and transmit information indicating reception conditions of radio signals from the two or more second base stations to the first base station; and
a receiver configured to receive data of the same content from the two or more second base stations according to an instruction received from the first base station.

15. A radio communication method for use in a mobile communication system including a plurality of cells and in which two or more cells broadcast data of the same content at the same timing by using the same frequency and modulation scheme among the plurality of cells, the radio communication method comprising:
notifying, by a first cell among the plurality of cells, a plurality of mobile stations of a second cell broadcasting the data of the same content among the plurality of cells;
transmitting, by a mobile station among the plurality of mobile stations, information indicating reception conditions of radio signals received by the mobile station from the notified second cell to the first cell; and
instructing, by the first cell, the mobile station to receive the data of the same content from the second cell depending on the information indicating the reception conditions.

* * * * *